United States Patent
Buer et al.

(10) Patent No.: US 9,015,467 B2
(45) Date of Patent: Apr. 21, 2015

(54) TAGGING MECHANISM FOR DATA PATH SECURITY PROCESSING

(75) Inventors: Mark L. Buer, Gilbert, AZ (US); Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 895 days.

(21) Appl. No.: 10/728,192

(22) Filed: Dec. 4, 2003

(65) Prior Publication Data

US 2004/0139313 A1    Jul. 15, 2004

Related U.S. Application Data

(60) Provisional application No. 60/431,166, filed on Dec. 5, 2002.

(51) Int. Cl.
*H04L 29/06* (2006.01)
*H04L 29/12* (2006.01)

(52) U.S. Cl.
CPC ............ *H04L 63/0485* (2013.01); *H04L 29/06* (2013.01); *H04L 29/12009* (2013.01); *H04L 29/12839* (2013.01); *H04L 61/6022* (2013.01); *H04L 63/123* (2013.01); *H04L 69/16* (2013.01); *H04L 69/22* (2013.01); *H04L 69/161* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 6,157,955 A | 12/2000 | Narad et al. | |
| 6,327,625 B1 | 12/2001 | Wang et al. | |
| 6,438,612 B1 * | 8/2002 | Ylonen et al. | 709/249 |
| 6,732,176 B1 | 5/2004 | Stewart et al. | |
| 6,839,346 B1 | 1/2005 | Kametani | |
| 6,947,430 B2 | 9/2005 | Bilic et al. | |
| 6,959,007 B1 | 10/2005 | Vogel et al. | |
| 6,963,946 B1 * | 11/2005 | Dwork et al. | 710/310 |

(Continued)

FOREIGN PATENT DOCUMENTS

| | | |
|---|---|---|
| EP | 1 328 104 A | 7/2003 |
| EP | 1 427 133 | 6/2004 |

(Continued)

OTHER PUBLICATIONS

Pidgeon, Nick, "How Ethernet Works", Apr. 2003, www.howstuffworks.com, accessed via web.archive.org on Jun. 24, 2007, pp. 1,2.*

(Continued)

*Primary Examiner* — Jeffery Williams
(74) *Attorney, Agent, or Firm* — Sterne, Kessler, Goldstein & Fox P.L.L.C.

(57) ABSTRACT

Methods and associated systems are disclosed for providing secured data transmission over a data network. Data to be encrypted and encryption information may be sent to a security processor via a packet network so that the security processor may extract the encryption information and use it to encrypt the data. The encryption information may include flow information, security association and/or other cryptographic information, and/or one or more addresses associated with such information. The encryption information may consist of a tag in a header that is appended to packets to be encrypted before the packets are sent to the security processor. The packet and tag header may be encapsulated into an Ethernet packet and routed via an Ethernet connection to the security processor.

35 Claims, 21 Drawing Sheets

(56) References Cited

U.S. PATENT DOCUMENTS

| | | | |
|---|---|---|---|
| 7,003,118 B1* | 2/2006 | Yang et al. .................... 380/287 |
| 7,062,566 B2 | 6/2006 | Amara et al. |
| 7,093,280 B2* | 8/2006 | Ke et al. ............................ 726/3 |
| 7,130,303 B2* | 10/2006 | Hadzic ......................... 370/389 |
| 7,131,141 B1* | 10/2006 | Blewett et al. .................. 726/12 |
| 7,155,518 B2* | 12/2006 | Forslow ........................ 709/227 |
| 7,162,630 B2 | 1/2007 | Sperry et al. |
| 7,194,766 B2* | 3/2007 | Noehring et al. ............... 726/13 |
| 2002/0162026 A1 | 10/2002 | Neuman et al. |
| 2003/0069973 A1* | 4/2003 | Ganesan et al. ............. 709/226 |
| 2003/0126233 A1* | 7/2003 | Bryers et al. .................. 709/219 |
| 2003/0128696 A1* | 7/2003 | Wengrovitz et al. .......... 370/352 |
| 2004/0042483 A1 | 3/2004 | Elzur et al. |
| 2004/0044798 A1 | 3/2004 | Elzur et al. |
| 2004/0062267 A1* | 4/2004 | Minami et al. ................ 370/463 |
| 2004/0090972 A1* | 5/2004 | Barrett et al. ................. 370/401 |
| 2004/0093411 A1 | 5/2004 | Elzur et al. |
| 2004/0139313 A1 | 7/2004 | Buer et al. |
| 2004/0143734 A1 | 7/2004 | Buer et al. |
| 2004/0225895 A1* | 11/2004 | Mukherjee et al. ........... 713/201 |
| 2008/0075073 A1* | 3/2008 | Swartz .......................... 370/389 |
| 2008/0144615 A1* | 6/2008 | Casey ........................... 370/389 |

FOREIGN PATENT DOCUMENTS

| | | |
|---|---|---|
| EP | 1 427 164 | 6/2004 |
| WO | WO 01/05086 A2 | 1/2001 |

OTHER PUBLICATIONS

Stevens, Richard, TCP/IP Illustrated, vol. 1, 1994, Addison Wesley, p. 21-23.*

Cassidy, Kyle, "An Ethernet Primer", 2001, Que Publishing, p. 1-8.*

Kent et al., "Security Architecture for the Internet Protocol", RFC 2401, Network Working Group, 1998.*

Krishna et al., "Distributed Processing in a Cryptography Acceleration Chip", U.S. Appl. No. 09/610,798, filed Jul. 6, 2000.

European Search Report for Appl. No. 03028115.8-2413, Nov. 28, 2007, 3 pages.

Anonymous, "HIFN 8300/8350 HIPP III Security Processors", Internet Article. Retrieved from the Internet on Oct. 2005 from URL:http//web.archive.org/web/20021101104154/http://www.hifn.com/products/8300- 8350.html Nov. 1, 2002, pp. 1-4.

Partial European Search Report for Application No. 03028116.6; date of completion Nov. 2, 2005, The Hague (2 pages); Lack of Unity of Invention, Sheet B (1 page); Annex to the European Search Report on European Patent Application No. 03028116.6 (1 page).

* cited by examiner

TAGGING MECHANISM FOR DATA PATH SECURITY PROCESSING

CROSS-REFERENCE TO RELATED APPLICATIONS

This application claims the benefit of U.S. Provisional Patent Application No. 60/431,166 filed Dec. 5, 2002, the disclosure of which is hereby incorporated by reference herein.

This application is related to U.S. patent application Ser. No. 10/727,430, entitled "DATA PATH SECURITY PROCESSING," filed on even date herewith and assigned to the same assignee as this application, the disclosure of which is hereby incorporated by reference herein.

FIELD OF THE INVENTION

The invention relates generally to the field of data communications and, more particularly, to systems and methods for providing secured data transmission over data networks.

BACKGROUND

The transmission of data over a data network typically involves sending messages between application programs ("applications") executing on host processors connected to the data network. In a packet network such as the Internet a host processor encapsulates data from an application into data packets (e.g., frames) to send the data over the packet network. When a host processor receives the data packet from the packet network, the host processor unencapsulates the packets to obtain the data. The host processor then provides the data to the appropriate application.

The process of encapsulating data into a packet involves adding information such as source and destination addresses to the data to facilitate transmission of the data over the packet network. Conventionally, the encapsulation process follows a particular packet data protocol. A typical protocol defines the structure of a packet such as the location of the source address and the destination address in the packet. A protocol also may define procedures for routing the packet over the network using those addresses. For example, the components in a data network may use the destination address to determine where to send the packet. The recipient application may use the source address to determine which application sent the packet.

Common protocols used in conjunction with the Internet include Internet protocol ("IP"), transmission control protocol ("TCP"), user datagram protocol ("UDP") and Internet control message protocol ("ICMP"). In general, IP relates to controlling data transfer between host processors, TCP relates to establishing sessions to transfer data between applications, UDP provides a faster but less reliable data transfer mechanism than TCP, and ICMP relates to error messages and network traffic statistics.

Data transmitted over public networks such as the Internet may be encrypted to prevent unauthorized parties from intercepting the data. Typically, a device connected to the network encrypts data using a cipher algorithm and an encryption key. The device sends the encrypted data over the network to another device that decrypts the data using the cipher algorithm and a decryption key.

Several standards have been developed to facilitate secure data transmission over data networks. For example, the Internet security protocol ("IPsec") may be used to establish secure host-to-host pipes and virtual private networks over the Internet. IPsec defines a set of specifications for cryptographic encryption and authentication. IPsec also supports several algorithms for key exchange, including an Internet Key Exchange ("IKE") algorithm for establishing keys for secure sessions established between applications.

Some systems include dedicated devices that offload some of the processing operations from the host processor. For example, a network processor may be used to perform some of the packet processing operations. A cryptographic accelerator may be used to perform the cipher algorithms to offload encryption/decryption processing from the host processor.

In a typical system, the primary data flow is from the host processor to the network processor then to the network, and vice-versa. In addition, the host processor or network processor routes packets that will be encrypted or decrypted to the cryptographic accelerator. The cryptographic accelerator then routes the encrypted or decrypted packets back to the host processor or network processor. In personal computer-based systems, the host processor, network processor and cryptographic accelerator typically are connected via a peripheral component interface ("PCI") bus.

There is a perpetual need for increased operating speed and implementation flexibility in data communications systems. On the one hand, developers are continually creating applications that require increasingly greater amounts of data to be sent between system components. On the other hand, end users want their applications to run faster which, in turn, often requires that associated data transfers be performed more quickly.

In an attempt to address the need for faster data communications, various groups have developed standards that specify high-speed data transfers between components of data communication systems. For example, IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s.

The development of these standards and the ever increasing need for faster data transfers create a need for techniques and circuits capable of achieving high data transfer rates. Moreover, there is an ever-present economic motivation to achieve such results in a cost effective and adaptable manner. Accordingly, a need exists for improved data security processing techniques to support data transmission over data networks.

SUMMARY

The invention relates to methods and associated systems for providing secured data transmission over a data network. For example, a device constructed according to the invention may provide a method of sending data to be encrypted/authenticated and encryption/authentication information to a security processor via a packet network. The security processor may then extract the encryption/authentication information and use it to encrypt/authenticate the data.

The encryption/authentication information may include, without limitation, flow information, security association and/or other cryptographic information, and/or one or more addresses associated with such information. In one embodiment, this information consists of an address of a security association stored in a data memory of a security processor. The security processor uses the address to retrieve the security association then uses the security association to encrypt/authenticate the packet.

In one embodiment of the invention, the encryption/authentication information consists of a tag in a header. This tag header may be appended to packets to be encrypted/authenticated before the packets are sent to a security processor. Thus, when the packet is sent to the security processor, the security processor strips the appended header from the received packet to get the tag information.

In one embodiment the packet and tag header are encapsulated into an Ethernet packet before they are sent to the security processor. The encapsulation process involves generating an outer Ethernet header that includes the address of the security processor and an Ethernet type identifier that identifies the packet as being one associated with a particular registered entity. In the assembled packet, the outer header precedes the tag header which, in turn, precedes the original packet. The tag header also may include a type field that identifies the header as one containing a tag.

In such a case, a security processor constructed according to one embodiment of the invention may include at least one network interface to send packets to and receive packets from a data network and at least one cryptographic engine for performing encryption, decryption and/or authentication operations. For convenience, the encryption and/or decryption and/or authentication operations may be abbreviated herein as encryption/decryption/authentication, etc.

A security processor constructed according to the invention may be configured as an in-line security processor so that it processes packets that pass through the device, as the packets are being routed through the data network. Thus, packets from the network passing through the device are intercepted, encrypted/decrypted/authenticated as necessary, then forwarded out onto the network.

For example, in one embodiment, packets associated with secure flows between application processors in an Ethernet network are encrypted/authenticated by a security processor before the packets are routed over the Ethernet network. The secure flows are associated with one or more security associations. The security processor stores security association information associated with each of these flows in a data memory. When an application processor needs to send a packet for a secure flow over the network, a network controller associated with the application processor identifies the flow, then identifies the address in the data memory that contains the security association for that flow. The network controller then sends this address in a tag with the packet to the security processor.

One embodiment of a system constructed according to the invention includes an Ethernet controller in combination with a security processor. The security processor performs IPsec operations. The Ethernet controller provides the network interface for a host processor and may also perform IP and TCP processing for the host processor. In this case, the Ethernet controller may send a tag containing flow information to the security processor to assist the security processor in performing IPsec operations. For example, the flow information may include an address of security association data (e.g., encryption/decryption/authentication keys) associated with each data flow. In one embodiment, the flow information is sent in a packet header that encapsulates the packet to be encrypted/decrypted/authenticated.

A system constructed according to one embodiment of the invention may communicate via a gigabit Ethernet network. Here, the security processor and Ethernet controller may include at least one gigabit MAC/PHY interface to interface with the gigabit Ethernet network.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
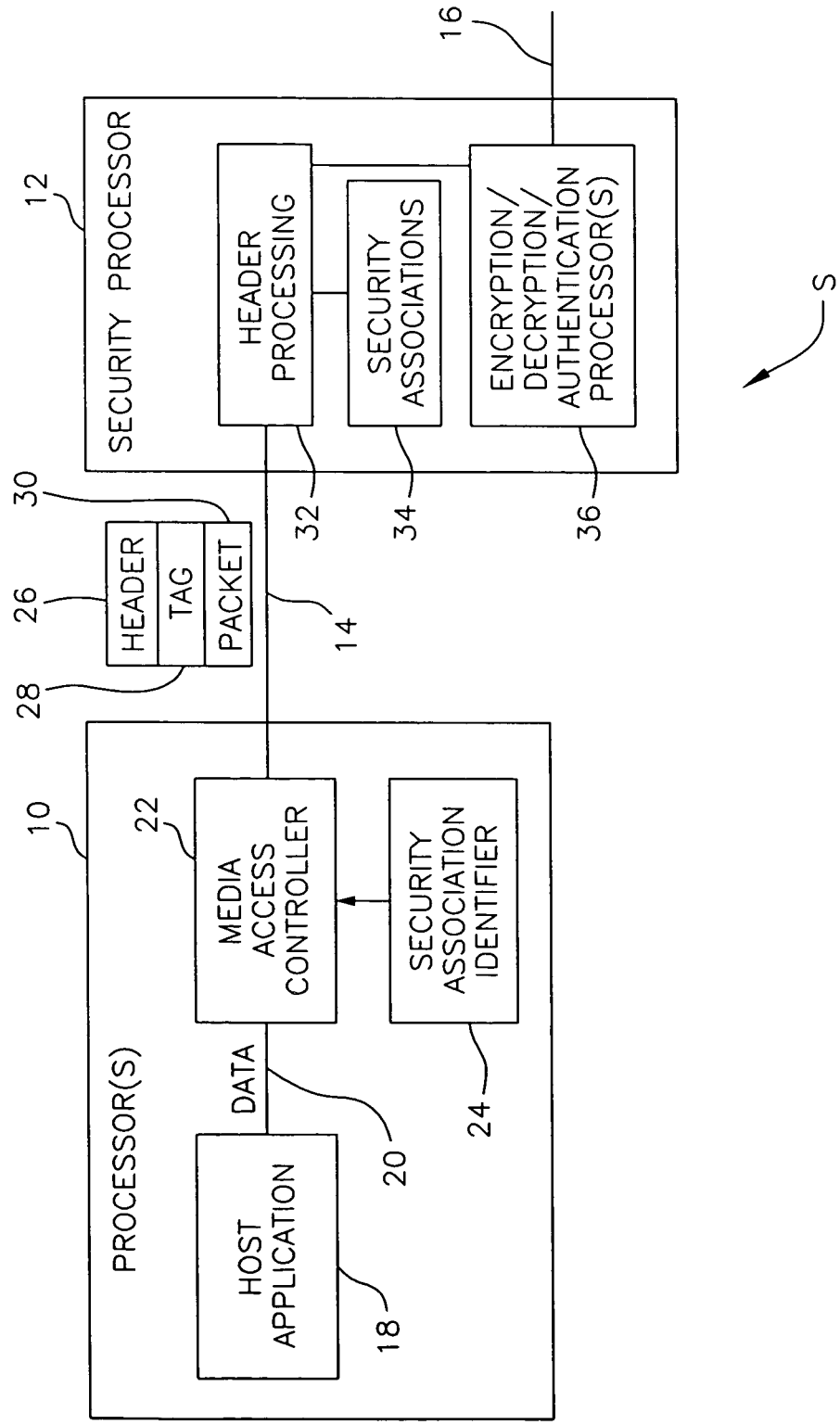
FIG. 1 is a block diagram of one embodiment of a security processing system constructed in accordance with the invention.

FIG. 1 is a block diagram of one embodiment of a security processing system S constructed according to the invention. A host application 18 executing on a processor 10 establishes a connection with another application (not shown) via a packet network 16. To provide secured data transmission, a security processor 12 encrypts, decrypts and/or authenticates data sent via the connection over the packet network 16. As used herein, the term security processor refers to one or more processing components that encrypt, decrypt or authenticate data or perform any combination of these operations.

In accordance with conventional practice, one or more encryption/decryption/authentication processor(s) 36 perform the encryption, decryption or authentication algorithm using a security association. For example, a security association may specify an encryption algorithm to be used to encrypt data from a particular application. A security association also may include an encryption key used by the encryption algorithm.

In practice, the application 18 may establish several connections with other applications via the packet network 16. To maintain the security of these connections, the security processor uses different security associations to encrypt/decrypt/authenticate the data for each of these connections.

In accordance with one embodiment of the invention, a tag 28 containing security association information is sent with the data to the security processor 12. The security processor 12 uses the security association information to retrieve security associations 34 associated with the data from a local data memory. The use of the tag 28 enables the security processor 12 to identify the security association 34 the encryption/decryption/authentication processor 36 needs to encrypt/authenticate the data.

This embodiment provides several advantages. For example, the security associations need not be sent to the security processor 12 with each packet. This reduces overhead for the data transmissions. In addition, by using an appropriate tag, the security processor 12 may quickly identify the proper security association for a given set of data.

Figure 2:
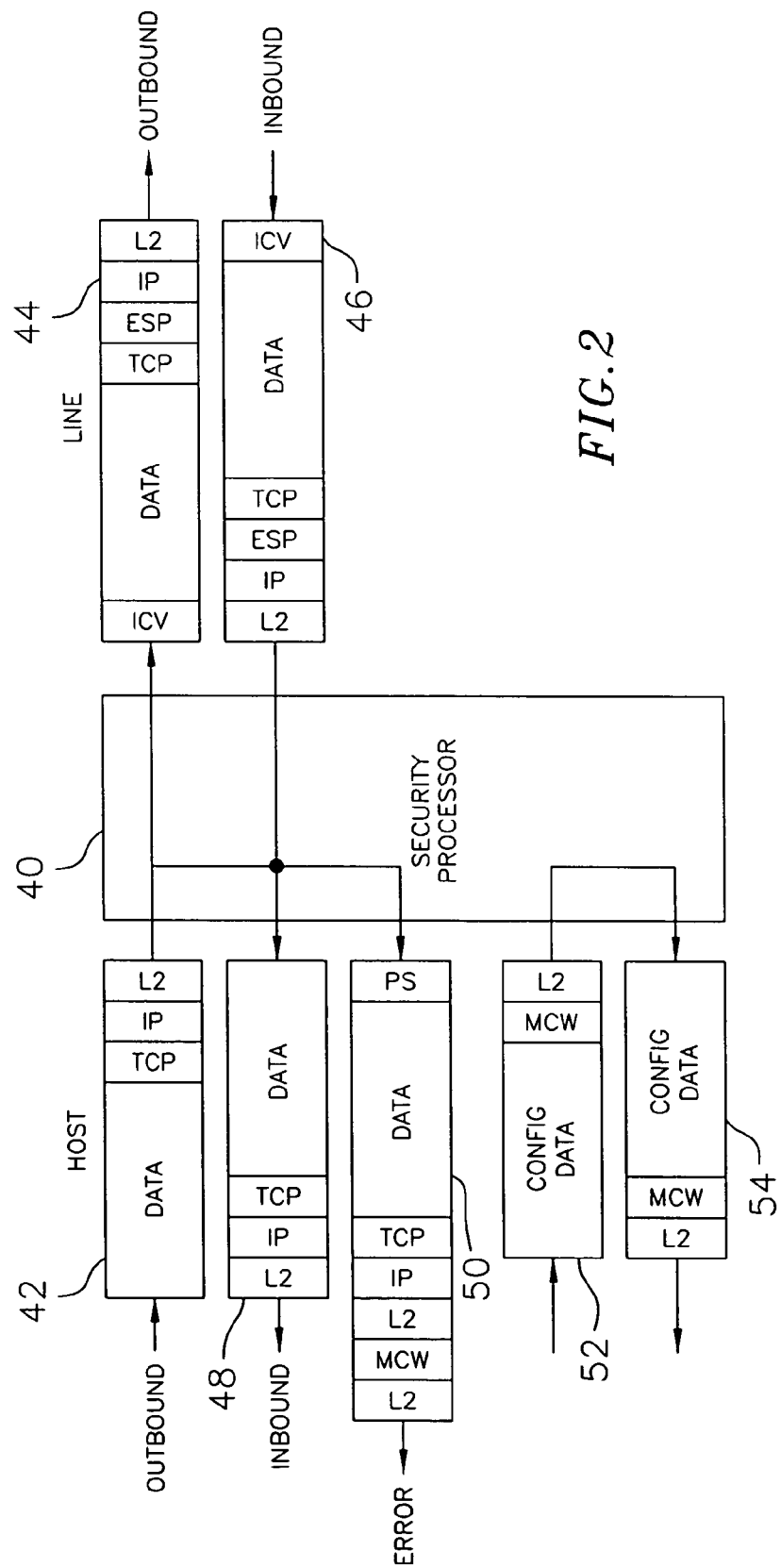
FIG. 2 is a block diagram illustrating one embodiment of packet data flow in the embodiment of FIG. 1.

Data flow in the system S will be treated in more detail in conjunction with FIG. 2. FIG. 2 illustrates one embodiment where the security processor 12 communicates with one or more processors (as represented by "processor(s) 10") via an ISO Layer 2 packet link conveying TCP/IP packets. In this example, outbound packet flow refers to packets sent from the processor(s) 10 to the packet network 16. Inbound packet flow refers to data received from the packet network 16 to the processor(s) 10.

The host application 18 executing on processor(s) 10 sends data to a media access controller 22 via link 20. A TCP/IP processor (not shown) in processor(s) 10 encapsulates the data into TCP/IP packets. The media access controller provides Layer 2 processing (e.g., Ethernet) to encapsulate the TCP/IP packets into Layer 2 ("L2") packets.

The packet 42 in FIG. 2 illustrates the layering of these protocols. The data is encapsulated into a TCP packet by, in part, appending a TCP header onto the data. The TCP packet is encapsulated into an IP packet by, in part, appending an IP header onto the TCP packet. The TCP/IP packet is encapsulated into an L2 packet by, in part, appending a L2 header onto the TCP/IP packet.

The security processor 40 encrypts/authenticates the outbound packet 42 and sends the resulting encrypted/authenticated packet over the packet network 16. For example, in one embodiment the security processor 40 performs IPsec processing on the packet 42 received from the processor(s) 10 and generates a packet 44 that is output to the packet network 16. The packet 42 includes header information (L2, IP, TCP) and data. A portion of this header information (e.g., the TCP header) and the data is encrypted/authenticated during IPsec processing by the security processor 40. The output packet 44 includes the encrypted/authenticated packet information (e.g., TCP, data), security information (ESP, ICV) and other header information (L2, IP). In a complementary operation, the security processor 40 may perform IPsec processing on a packet 46 received from the packet network 16 and generates a packet 48 that is output to the processor(s) 10. For example, the security processor 40 decrypts/authenticates the encrypted/authenticated packet information (e.g., TCP, data) from the packet 46 and reformats the decrypted/authenticated packet information (e.g., TCP, data) into the packet 48. Thus, the operation of an IPsec compliant security processor may include adding and/or removing IPsec protocol elements including, for example, headers, trailers and/or other data.

Referring again to FIG. 1, according to one embodiment of the invention a header 26 may be appended to the packet 30 that the processor(s) 10 sends to the security processor 12 via link 14. The header 26 may include a tag that consists of a security association identifier. In one embodiment, the security association identifier is the address of the location in data memory that contains the security association 34 that should be used to encrypt/authenticate the data.

A header processing operation 32 in the security processor 12 strips the header 26 and the tag 28 from incoming packets, as necessary, to extract the security association identifier. The security processor 12 then uses the security association identifier to retrieve a security association 34 from a local data memory. This security association is passed to the encryption/decryption/authentication processor 36 for the encryption/authentication operation.

Figure 3:
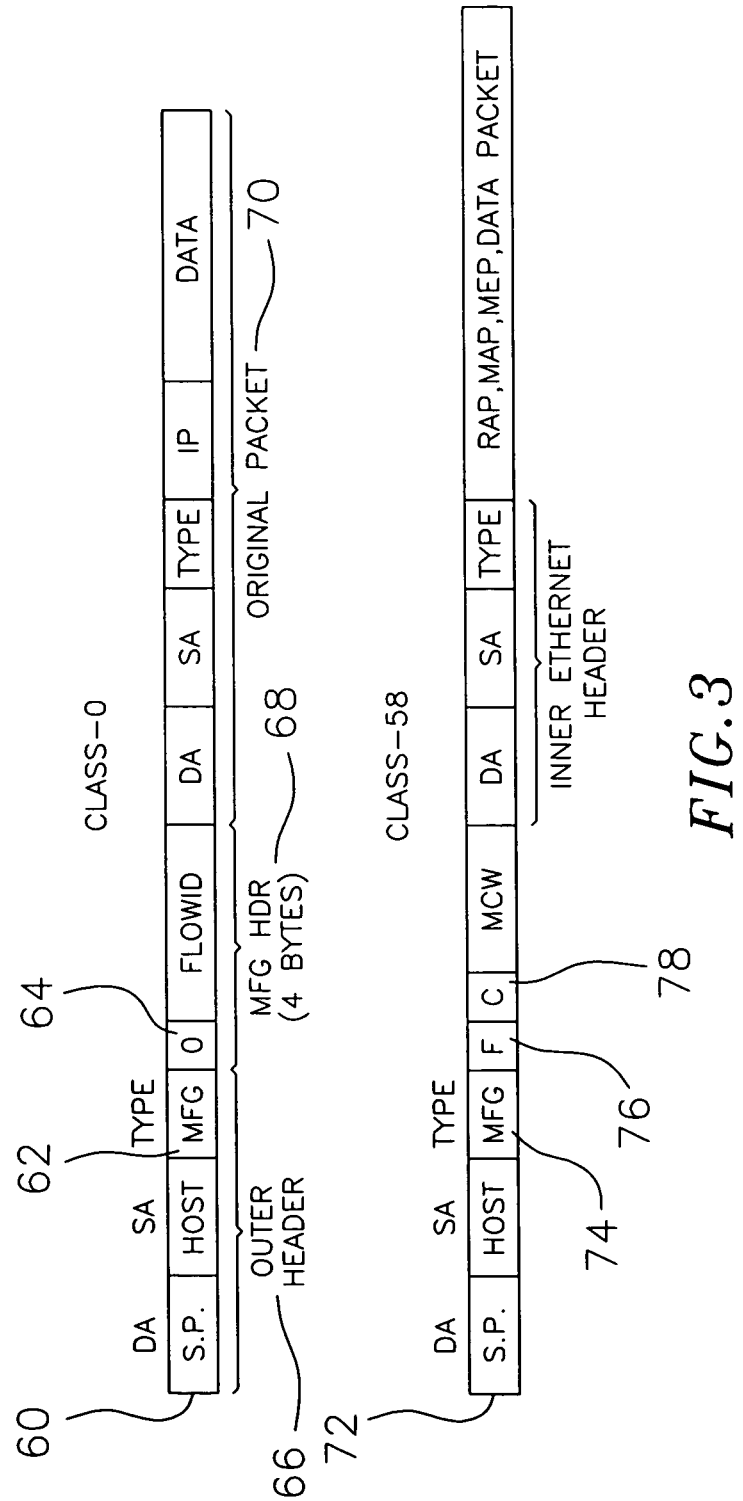
FIG. 3 is a block diagram representative of one embodiment of Ethernet frames with headers in accordance with the invention.

Referring now to FIG. 3, one embodiment of a tagging mechanism will be discussed in more detail. In this embodiment, the processor(s) 10 encapsulate the packet 30 of FIG. 1 into another Layer 2 packet for transmission over a Layer 2 link (e.g., link 14) to the security processor 12. For example, an original packet 70 (FIG. 3) includes data, an IP header and an L2 header (DA, SA and type). The DA field in each packet contains a destination address. The SA field contains a source address. The Ethernet type field may be used to indicate that the packet is associated with a particular entity (e.g., a chip manufacturer) that has registered with the I.E.E.E.

The processor(s) 10 appends an outer Ethernet header 66 and another header 68 to the original packet 70. Here, S.P. represents an address of a security processor. Thus, the L2 packet 60 may be routed over an Ethernet network to a security processor that supports L2 processing (e.g., one that incorporates a media access controller).

The processor(s) 10 also insert a tag (e.g., FlowID) and a type 64 into the manufacturer-specific header 68 (also referred to as a security header). The header 68 in this example contains 4 bytes. The first byte is the type 64, in this example a value of zero. The last three bytes contain the FlowID.

When the security processor receives a packet 60 with the security processor's address in the DA field of the outer header 66, the security processor may check the Ethernet type field 62 to determine how to process the packet header. A company such as Broadcom Corporation may have a unique registered Ethernet type 62 that is used to define in-band packet communication. As discussed above, this type is registered with the I.E.E.E.

In this embodiment, the security processor recognizes two formats of this custom in-band communication scheme. The first format (CLASS-0) is intended for all devices of a company where a flow tag ("FlowID") has been used to identify the unique "flow" (e.g., secure session) for a packet. One embodiment of such a packet is the top packet 60 of FIG. 3. The first byte 64 of the second header (MFG_HDR 68) is always zero to indicate that the MFG_HDR 68 is four bytes and contains a 3-byte flow identifier ("FlowID").

The second format (CLASS-F for FAMILY) is used on a per chip basis for configuration access that is defined by the device. One embodiment of such a packet is the lower packet 72 of FIG. 3. If the first byte 76 after the outer header is non-zero, the information that follows (i.e., block 78) is ignored by all devices except the assigned class. For example, all security devices made by a manufacturer may use a prefix of 0x58 as the first byte 76 to indicate the security processor class. The next byte 78 may be defined as the subclass or device family ID. A value of 0x45 may be used for the security processor. This two-byte code automatically aligns the next word of the configuration packet (the MCW) to a 32-bit boundary.

As shown in FIG. 3, the CLASS-F packet 72 may be used to send configuration packets and data packets to the security processor. Operations such as memory access, register access and flow access may be sent in this manner. Fields in the MCW may be used to indicate which of these types of packets is contained in this CLASS-F packet.

The inner Ethernet header is a header that may be used to return the packet to the original sender. Thus, the DA in the inner Ethernet header may be the address of an Ethernet controller that sent a configuration packet or data packet to the security processor. This format provides a relatively easy mechanism for supporting multiple devices with a single security processor.

Each device builds the packet that will be sent back to the device. The security processor may then simply strip the outer header and the security header (F, C, MCW), modify the packet data (SAP, MAP, MEP, DATA), if applicable, and send the inner packet back to the device. For example, for a read access, the returned packet would contain the data from the memory or register accessed.

Referring again to the CLASS-0 packet 60, when the security processor receives such a packet, it may extract the FlowID to identify the security association that should be used to encrypt/authenticate the original packet 70. Additional details of how a tag (e.g., FlowID) may be generated, maintained and used are discussed below.

Figure 4:
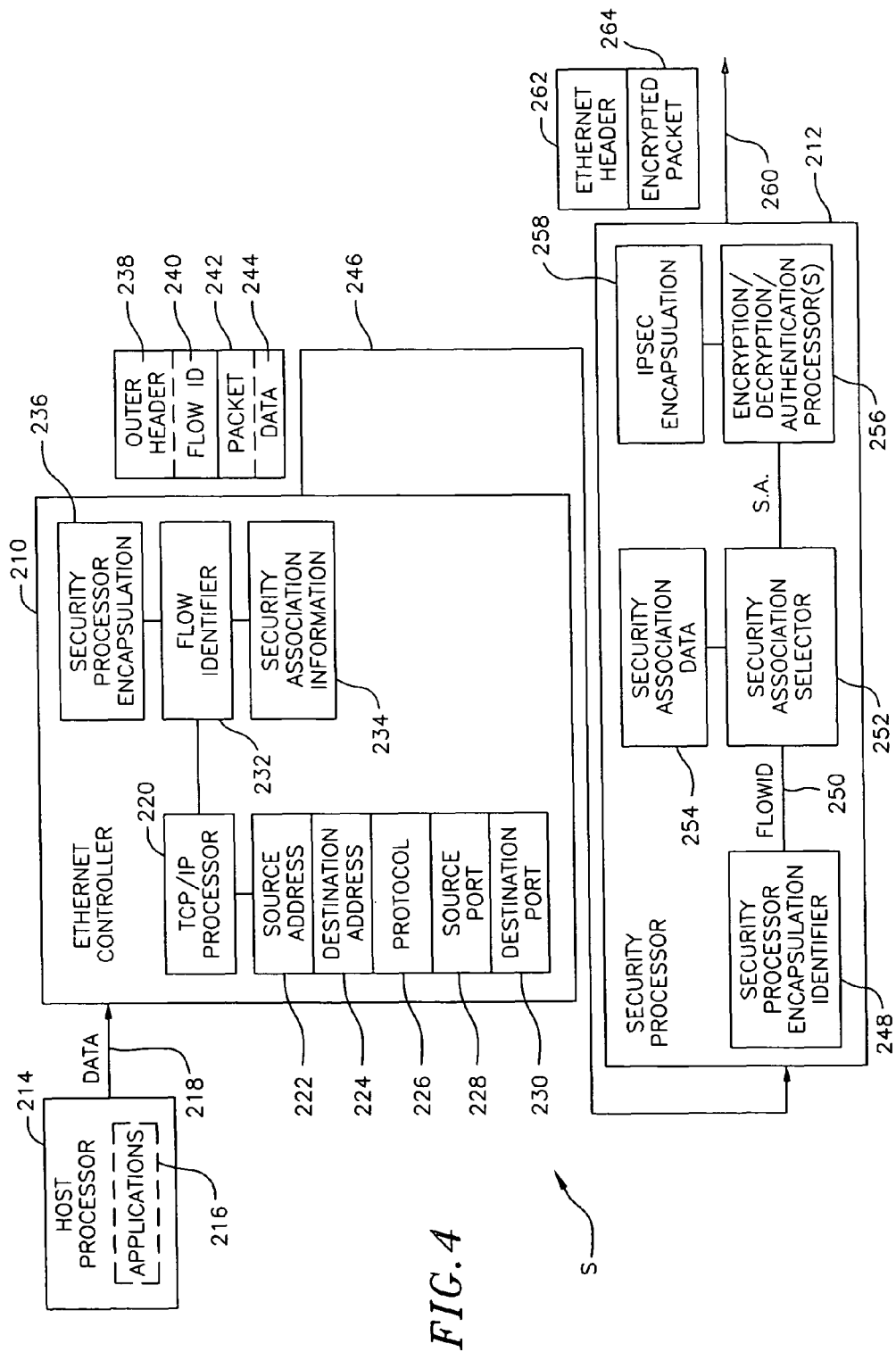
FIG. 4 is a block diagram of one embodiment of a security processing system constructed in accordance with the invention.

FIG. 4 is a block diagram of another embodiment of a security processing system S constructed according to the invention. A security processor 212 in the system is installed in the data path of a packet network to provide encryption, decryption, authentication and other security functions for data flowing through the packet network. The portions of the packet network connected to each side of the security processor 212 are identified as packet network 246 and packet network 260.

In the example of FIG. 4 data flows through the packet network between applications 216 executing on a host processor 214 and other applications executing on other host computing systems (not shown) that connect to the packet network 260. The host processor 214 and an Ethernet controller 210 cooperate to provide packet processing to enable the applications 216 to send and receive data over the packet network. The host computing systems that are not shown perform similar packet operations as well as security operations complementary to those performed by the security processor 212.

The security processor 212 and the security operations of the host computing systems that connect to the packet network 260 cooperate to securely transmit selected data over the packet network 260. To this end, the security processor 212 and these host computing systems encrypt/authenticate the selected data before sending it over the packet network 260. In one embodiment, these security components generate IPsec packets. When the security processor 212 and the host computing systems receive encrypted/authenticated packets they decrypt/authenticate the packets and forward them to the applications.

The security processor 212 and the Ethernet controller 210 include network interface components to enable the security processor 212 and the Ethernet controller 210 to send and receive data over the packet networks 246 and 260. On the security processor 212, one network interface connects to the packet network 246 and another network interface connects to the packet network 260. In this way, the security processor is in-line with the data path of the packet network. In contrast, traditional security processors connect to network processors via separate busses (e.g., a PCI bus or a POS-PHY interface) and are, therefore, outside the data path of the network.

A device constructed according to this embodiment of the invention may provide several advantages over conventional systems. A security processor may be shared among several host processors. In addition, several security processors may be configured to provide security services for a high-speed network. Also, the security processor may be located at a location that is remote from the location of the host processor. In this case, the network between the host processor and the security processor may need to provide a certain level of security.

A device constructed according to this embodiment of the invention also may be configured via the packet network. For example, the host processor 214 may send IPsec configuration packets to the security processor 212 via the packet network 246. In addition, data used by the security processor 212 may be sent to the security processor 212 via the packet network 246. For example, the host processor 214 and/or the Ethernet controller 210 may send packets containing security associations and information related to the security associations (e.g., the addresses of the security associations) to the security processor 212.

One embodiment of configuration packet flow is depicted in FIG. 2. Here, the security processor 40 may be configured using packets received over a packet network. A configuration packet 52 contains configuration data, a master control word ("MCW") and a Layer 2 header L2. If desired, the security processor may be set up to send configuration packets 54 back to the processor(s) 10.

The security processor 40 may be initially configured so that it is configurable only from a trusted side of the network. This prevents unauthorized parties from altering the configuration of the security processor by hacking into the system from the public network. In the example of FIG. 2, the trusted (or secure) side is referred to as the "host" side and the other non-trusted (or non-secure) side, the "line" side. Hence, the security processor 40 may be configured using packets received from the processor(s) 10.

Typically, the security processor 40 will include maintenance and error handling capabilities. For example, loopback paths may be provided for inbound, outbound and configuration packets. In addition, the security processor 40 may send error packets 50 to the processor(s) 10. In one embodiment, the error packets may include an MCW.

Referring again to FIG. 4, the operations of selecting and using a tag will be discussed in more detail. The Ethernet controller 210 includes a TCP/IP processor 220 for offloading TCP/IP operations off of the host processor 214. Thus, an application may send unpacketized data to the Ethernet controller via a link 218 such as a data bus (e.g., PCI bus, PCI-X bus, PCI-Express bus, referred to herein generally as a PCI bus). The Ethernet controller may then build the TCP/IP packet. To this end, the Ethernet controller must identify the correct source address 222, destination address 224, protocol 226, source port 228 and destination port 230 for each TCP session. In addition, each secure session will have a set of security associations that are to be used to encrypt/decrypt/authenticate transmitted packets for that session.

In accordance with one embodiment of the invention, the Ethernet controller 210 configures the security associations in the security processor 212. For example, the Ethernet controller 210 may send the security associations to the security processor and specify the address in the local memory of the security processor at which each security association is stored. In this way, the Ethernet controller may simply send an address or a reference to an address to the security processor to indicate which security association is to be used to encrypt a given packet.

An example is illustrative. It is assumed that a session has been established for an application 216 executing on the host processor 214 and that the security associations have been assigned and stored. When the application 216 sends data to the Ethernet controller 210, the TCP/IP processor 220 assembles the TCP/IP packet. During this process, the Ethernet controller assembles enough information to uniquely identify the flow. For example, the source address 222, destination address 224, protocol 226, source port 228 and destination port 230. This information also uniquely identifies the security association for the flow. Hence, a flow identifier 232 retrieves the corresponding security association information 234 (e.g., the address of the security association) and provides it to a security processor encapsulation process 236 that generates an outer header 238, adds the tag (e.g., flow id 24) to the packet 242 that includes the data 244 from the application 216. The Ethernet controller sends this new packet to the security processor over the packet network 246.

A security processor encapsulation identifier 248 determines whether the packet contains a flow id 240 and, if so, strips the outer header off of the packet. The flow id is then sent to a security association selector 252 via link 250. The security association selector 252 uses the flow id to retrieve security association data 254 (e.g., a security association) associated with the packet. The security association data is then sent to an encryption/decryption/authentication engine 256 that uses the security association data to encrypt/authenticate the packet. An IPsec encapsulation process 258 encapsulates the encrypted/authenticated packet by, in part, adding an Ethernet header 262 to the encrypted/authenticated packet 264. The security processor 212 then routes the IPsec packet over the packet network 260.

One implementation of the embodiment of FIG. 4 consists of a network interface card ("NIC") that connects to a motherboard of a computer system. The host processor 214 resides on the motherboard and the Ethernet controller 210 and the security processor 212 reside on the NIC. In this implementation the packet network 246 may consist of a connection between the Ethernet controller 210 and the security processor 212 on the NIC.

Typically, the packet networks described herein would be Ethernet networks. In this case the network processor may be implemented as an Ethernet controller as shown in FIG. 4 that offloads Ethernet processing and other functions from the host processor. In addition, the security processor may support IPsec. It should be understood, however, that the invention may be practiced using other types of networks, network interfaces and security protocols.

Figure 5:
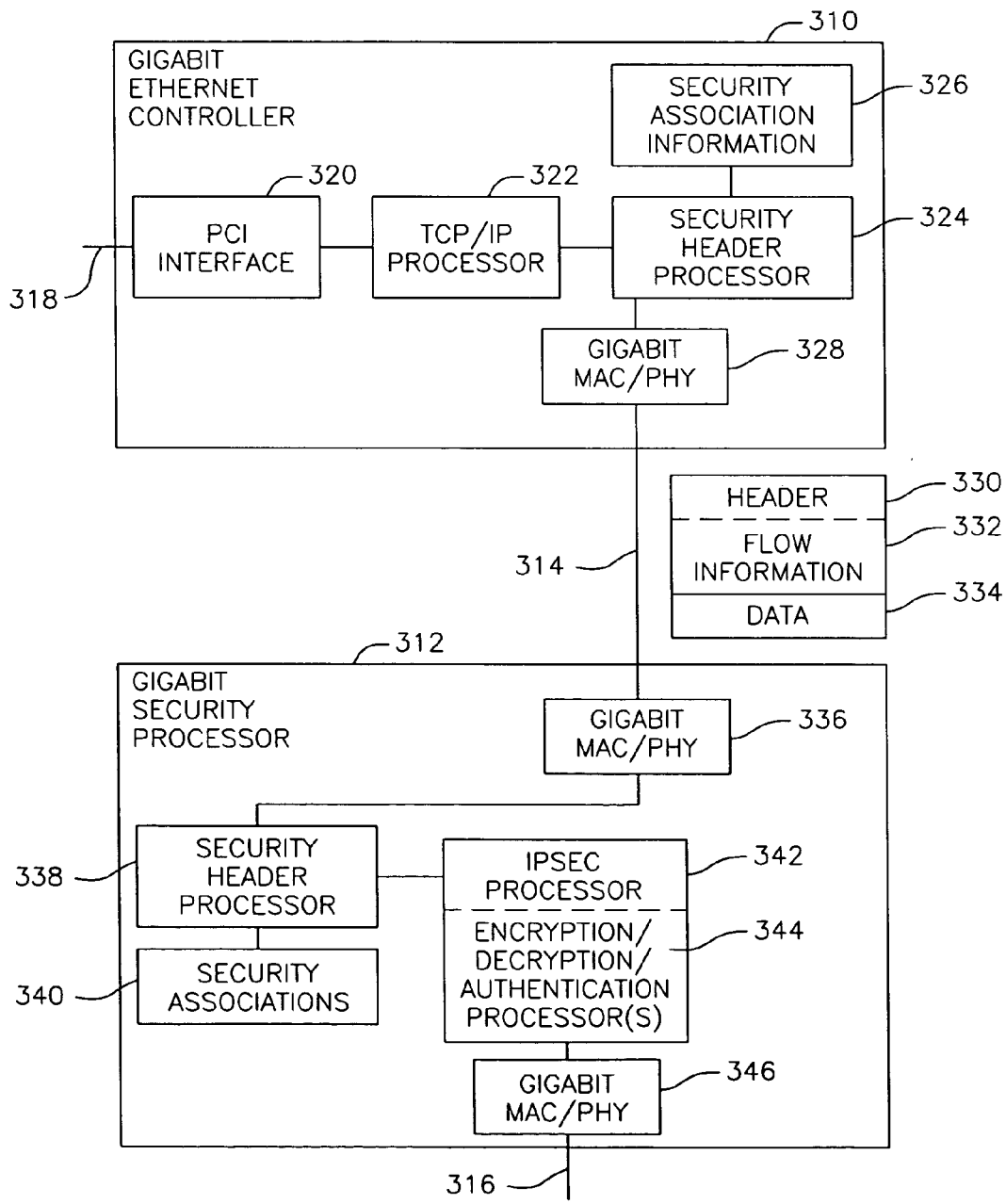
FIG. 5 is a block diagram of one embodiment of a Gigabit network interface system constructed in accordance with the invention.
Figure 6:
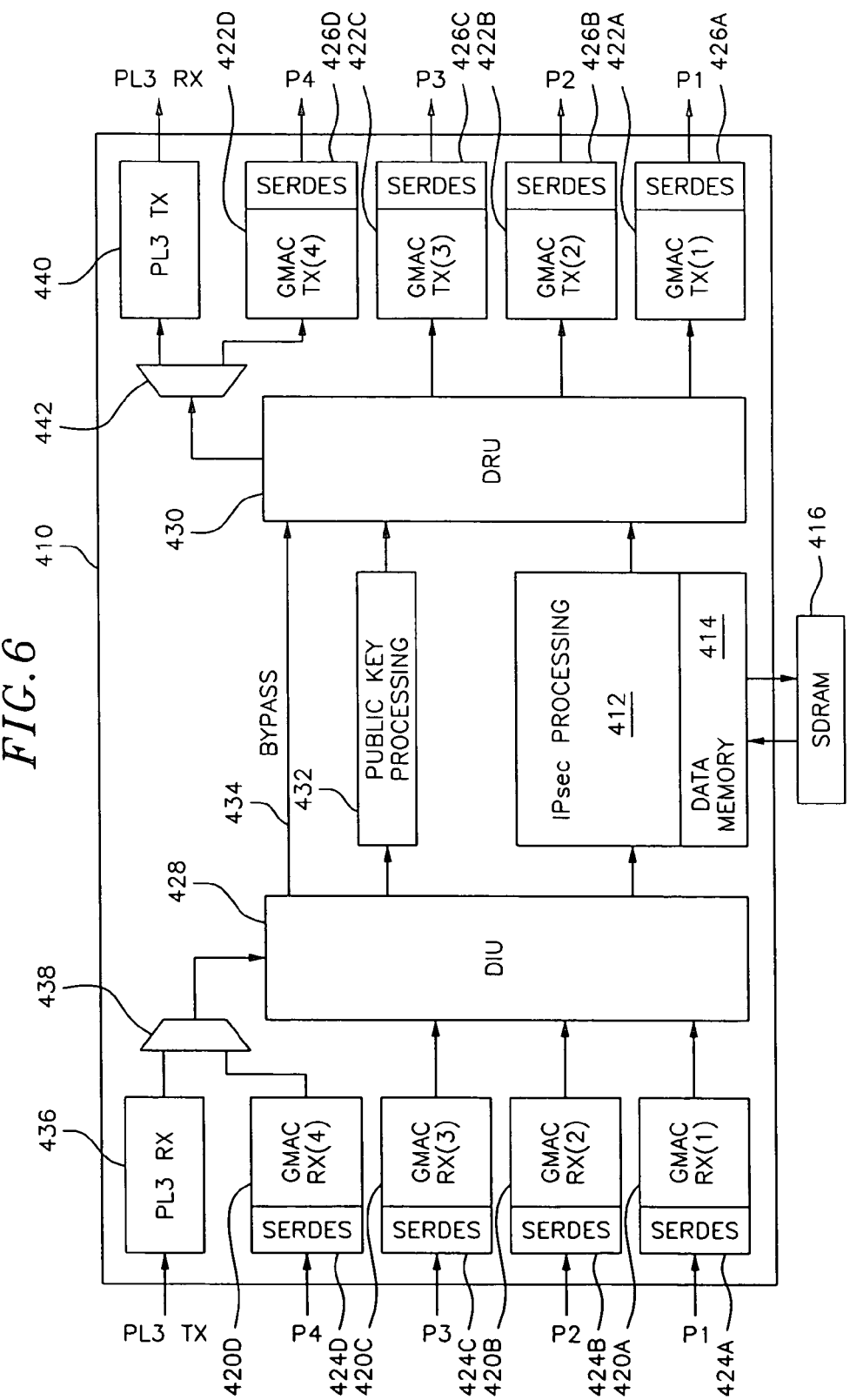
FIG. 6 is a block diagram of one embodiment of a security processor constructed in accordance with the invention.
Figure 7:
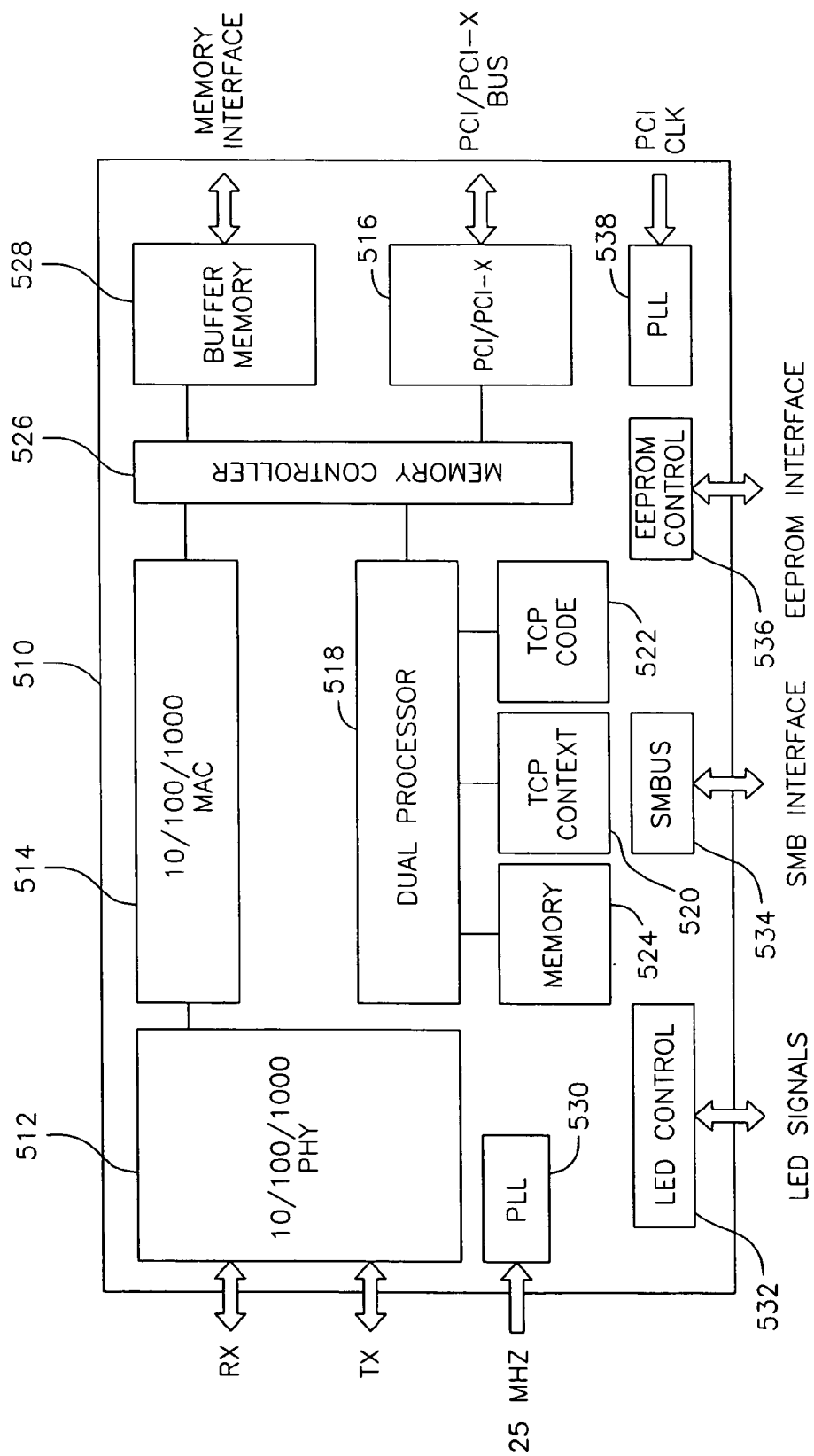
FIG. 7 is a block diagram of one embodiment of an Ethernet controller constructed in accordance with the invention.

Referring now to FIGS. 5-7, an embodiment of a secure network interface for a Gigabit Ethernet application will be discussed. This embodiment of the invention may be implemented as a NIC that connects to a PCI or PCI-X bus 318 of a host computer (not shown) to connect the host computer to a Gigabit Ethernet network 316. The NIC includes a Gigabit Ethernet controller 310 and a Gigabit security processor 312. The controller 310 and the processor 213 may be implemented on the NIC in one or more integrated circuits.

The Gigabit Ethernet controller 310 includes standard controller components for interfacing with the busses. A PCI interface 320 provides connectivity to the PCI bus 318. A Gigabit MAC/PHY provides connectivity to a Gigabit Ethernet bus 314.

In addition, the Gigabit Ethernet controller 310 includes components for offloading TCP operations from the host processor. For example, a TCP/IP processor 322 performs packet assembly for outbound packets and packet disassembly for inbound packets. In addition, a security header processor 324 provides support for IPsec operations. The processors 322, 324 and other components of the Gigabit Ethernet controller 310 may be implemented in hardware and/or as software code executing on one or more processors.

The Gigabit security processor 312 includes several components that perform the IPsec operations. An IPsec processor 342 processes packets associated with secure sessions. For example, the IPsec processor incorporates one or more encryption/decryption/authentication engines 344 that encrypt, decrypt and/or authenticate packets received over the networks 314 and 316. Security associations 340 used in the encryption/decryption/authentication operations are stored in internal and/or external data memory. The processors 342 and other components of the Gigabit security processor 312 may be implemented in hardware and/or as software code executing on one or more processors.

The Gigabit security processor 312 also includes Gigabit MAC/PHY interfaces 336 and 316 for connecting the processor 312 to the Gigabit Ethernet networks 314 and 316, respectively. In one embodiment the GMAC/PHY interfaces 336 and 316 comprise 10/100/1000 Gigabit media access controllers ("GMACs") with integrated serializer/deserializers ("SERDES").

The incorporation of the GMAC ports into the security processor gives it the capability to process data directly from the wire. A brief description of data flow through the system of FIG. 5 for a secure session follows. The host sends application data to the Gigabit Ethernet controller 310 via the PCI bus 318. The Gigabit Ethernet controller 310 encapsulates the data to form TCP/IP packets and sends the outbound packets to the Gigabit security processor 312 via connections 314 on the NIC. The Gigabit security processor 312 performs IPsec operations on the packets. These operations include encrypting/authenticating the packets and encapsulating the encrypted/authenticated packets into IPsec packets. The Gigabit security processor 312 then sends the IPsec packets to the Gigabit network 316.

Complementary operations are performed on inbound IPsec packets. The Gigabit security processor 312 performs IPsec operations on the inbound IPsec packets. These operations include unencapsulating the IPsec packets and decrypting/authenticating the encrypted/authenticated packets. The Gigabit security processor 312 sends the decrypted/authenticated packets to the Gigabit Ethernet controller 310 via wires 314. The Gigabit Ethernet controller 310 then strips the TCP/IP packet header from the packet and sends the data to the host via the PCI bus 318.

In one embodiment, the Gigabit security processor 312 and the Gigabit Ethernet controller 310 include security header processors 338 and 324, respectively, for processing packet headers for packets associated with secure sessions. For outbound data, the security header processor 324 encapsulates the outbound TCP/IP packets with an outer security header 330. Thus, the TCP/IP packets comprise the data 334 for new packet.

The security header 330 may include, for example, information that identifies the Gigabit security processor 312. In one embodiment, this information consists of an address assigned to the Gigabit security processor 312.

The security header 330 also may include flow information 332 related to the secure session. In one embodiment, the flow information 332 includes the address of the security association that the Gigabit security processor 312 must use to encrypt/authenticate the outbound TCP/IP packet. The Gigabit Ethernet controller 310 may generate this security association information when it builds the TCP/IP packets for the secure session. In this case, the Gigabit Ethernet controller 310 typically stores the security association information 326 with context information for the secure session.

The security header processor 338 checks the packet to determine whether it should process the packet. For example, the security processor 338 may read the security header to determine whether the header includes the address of the Gigabit security processor 312. If so, the security header processor 338 retrieves the flow information 332 and strips the security header 330 from the packet. The security header processor 338 then retrieves the security association 340 identified by the flow information 332 and sends the TCP/IP packet and the security association to the IPsec processor 342. The IPsec processor then encrypts/authenticates the TCP/IP packet using the security association 340 and formats the encrypted/authenticated packet into an IPsec packet.

By supplying flow information in the packets, the embodiment described above provides an advantageous security processing solution. For example, as discussed below the system may meet fixed latency times for security association lookup and memory requirements may be reduced. In addition, this technique provides an effective manner of obtaining TCP information when the TCP functionality is provided in a hardware device. In the embodiment described above the TCP information does not need to be provided via a separate bus or a side band path.

FIG. 6 illustrates one implementation of a Gigabit security processor 410. This implementation includes quad 10/100/1000 GMACs (receivers 420A-D, transmitters 422A-D) with integrated SERDES (receivers 424A-D, transmitters 426A-D). Each of the GMACs may be configured to interface with a host side network or a line side network. The network inputs and outputs for the GMACs are labeled P1-P4.

The Gigabit security processor 410 also includes a PL3 interface. The input to the PL3 receiver 436 is labeled PL3 TX. The output of the PL3 transmitter 440 is labeled PL3 RX.

One of the GMACs may be swapped with a PL3 interface. On the receive side, this is accomplished by a multiplexer 438 that selects either the signal from PL3 receiver 436 or the GMAC RX(4) 420D to be sent to a data input unit ("DIU") 428. On the transmit side, a demultiplexer 442 sends output data from a data routing unit ("DRU") 430 to either the PL3 transmitter 440 or the GMAC TX(4) 422D.

The DIU 428 manages packet flow from the receiver inputs into the processing path of the Gigabit security processor 410 and may extract and process header information. Packets may be routed to a bypass path 434, for example, when no security processing is necessary. This would be the case for non-IPsec packets flowing through the Gigabit security processor 410. Packets may be routed to a public key processing component 432. Packets also may be routed to an IPsec processing component 412 based, for example, on analysis of packet header information as discussed herein. The Gigabit security processor 410 includes an internal data memory 414 as well a memory interface component to access external data memory such as a serial dynamic random access memory ("SDRAM") 416. Additional details of one embodiment of the processing path of a Gigabit security processor are described in U.S. patent application Ser. No. 09/610,798 filed on Jul. 6, 2000 and entitled "DISTRIBUTED PROCESSING IN A CRYPTOGRAPHY ACCELERATION CHIP," the disclosure of which is hereby incorporated by reference herein.

The DRU 430 manages data from the processing path of the Gigabit security processor 410 to be sent to the device outputs. Thus, the DRU 430 routes packets to the GMAC transmitters 422A-C and the demultiplexer 442.

FIG. 7 illustrates one implementation of a Gigabit Ethernet controller 510. This implementation includes a dual processor 518 for performing, among other tasks, TCP processing. Executable code for the TCP processing is stored in a data memory 522. The dual processor 518 stores TCP context information in a data memory 520. A data memory 524 provides additional data storage for the dual processor 518.

Data flow in the Gigabit Ethernet controller 510 is controlled, in part, by a memory controller 526. For example, the memory controller 526 manages data flow between the Gigabit network and the PCI bus. A PCI/PCI-X interface 516 interfaces with the PCI/PCI-X bus that connects to the host computer (not shown). The memory controller 526 also controls access to an internal buffer memory 528 and external data memory accessed via a memory interface.

The Gigabit Ethernet controller 510 also includes various support components. Phase lock loop circuits 530 and 538 provide clocks for the processor 510. The processor 510 includes interfaces for external EEPROM 536, an SMBus 534 and LEDs 532.

Additional details of embodiments of network interface and TOE structures and operations are described in the following U.S. patent applications: U.S. patent application Ser. No. 10/652,267, entitled "SYSTEM AND METHOD FOR TCP OFFLOAD," filed on Aug. 29, 2003; U.S. patent application Ser. No. 10/652,330, entitled "SYSTEM AND METHOD FOR NETWORK INTERFACING," filed on Aug. 29, 2003; U.S. patent application Ser. No. 10/652,327, entitled "SYSTEM AND METHOD FOR NETWORK INTERFACING IN A MULTIPLE NETWORK ENVIRONMENT," filed on Aug. 29, 2003; and U.S. Provisional Patent Application No. 60/456,265, entitled "SYSTEM AND METHOD FOR TCP OFFLOAD," filed Mar. 20, 2003. Each of these patent applications is assigned to the same assignee as this application. The disclosures of these applications are hereby incorporated by reference herein.

Figure 8:
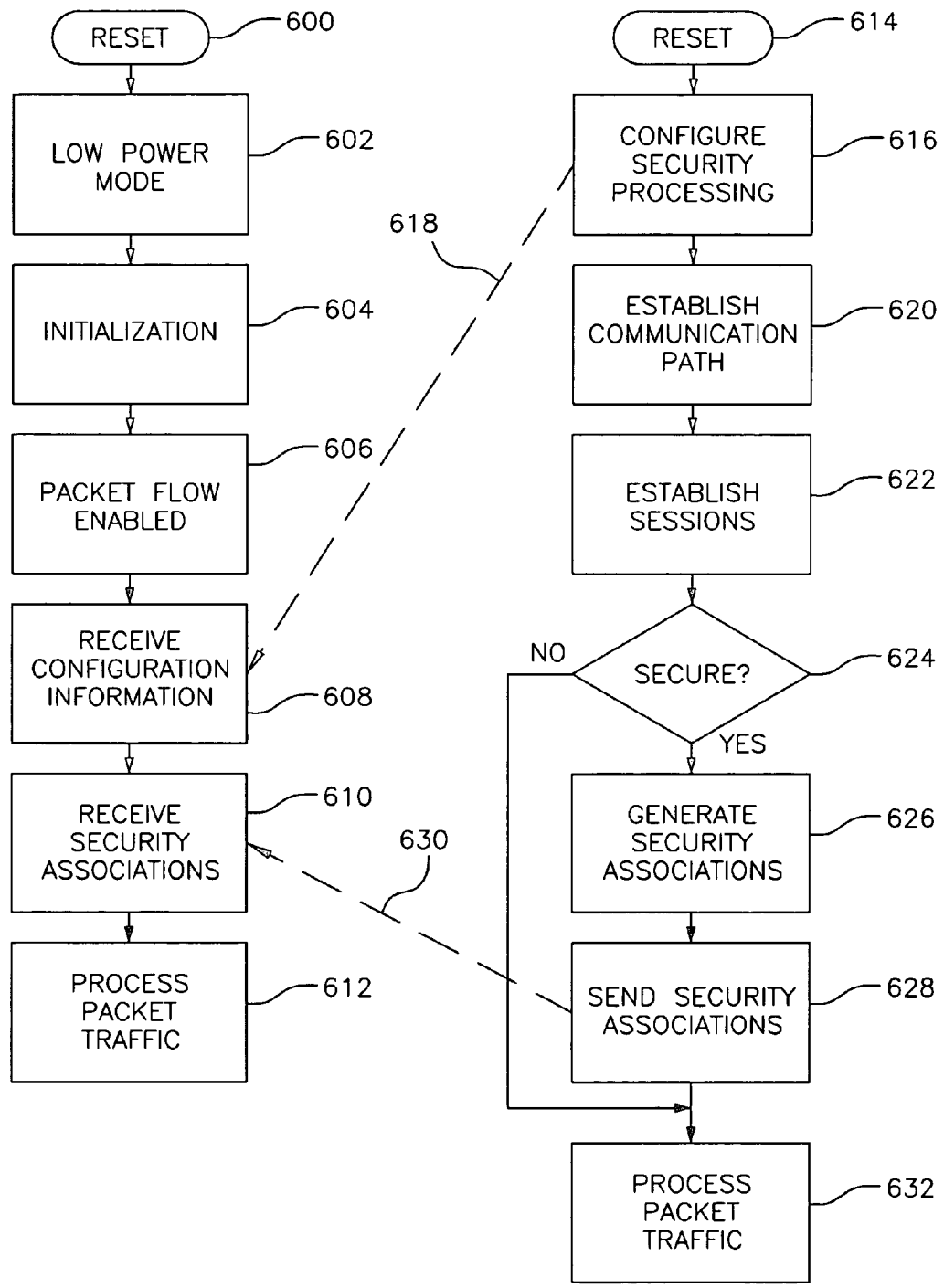
FIG. 8 is a flowchart representative of one embodiment of initialization and configuration operations that may be performed in accordance with the invention.
Figure 9:
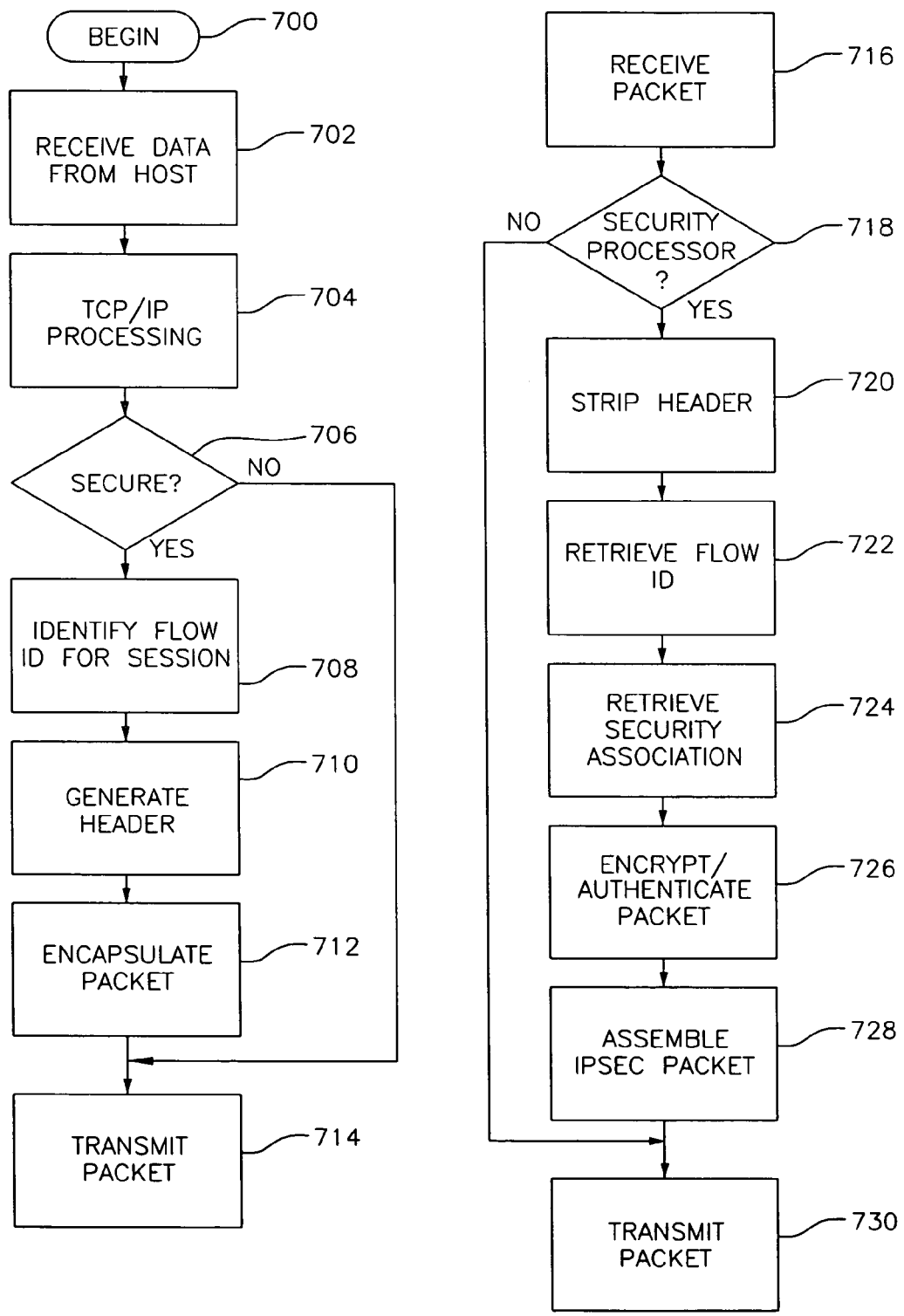
FIG. 9 is a flowchart representative of one embodiment of outbound processing operations that may be performed in accordance with the invention.
Figure 10:
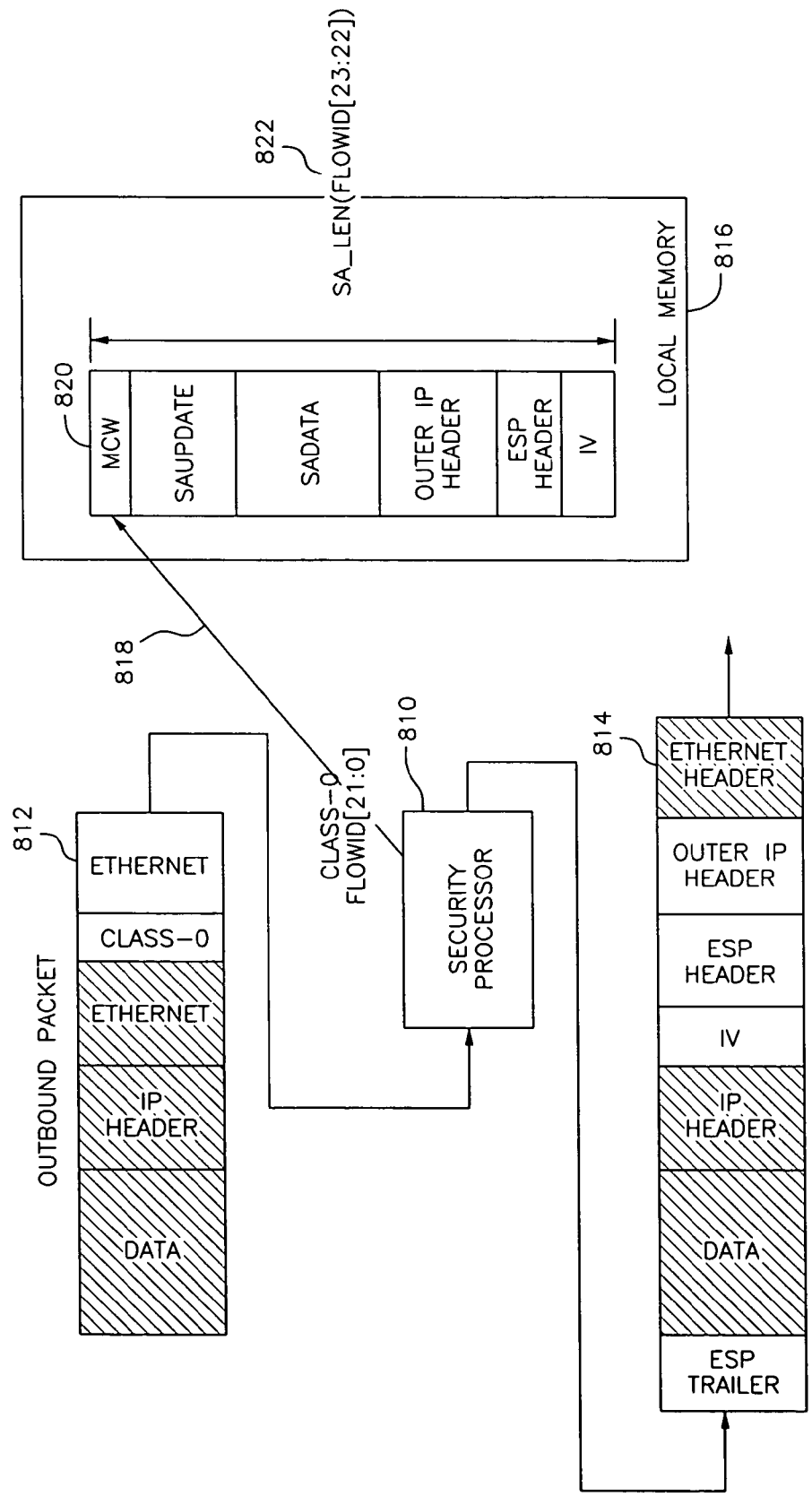
FIG. 10 is a block diagram representative of one embodiment of outbound processing flow in accordance with the invention.
Figure 11:
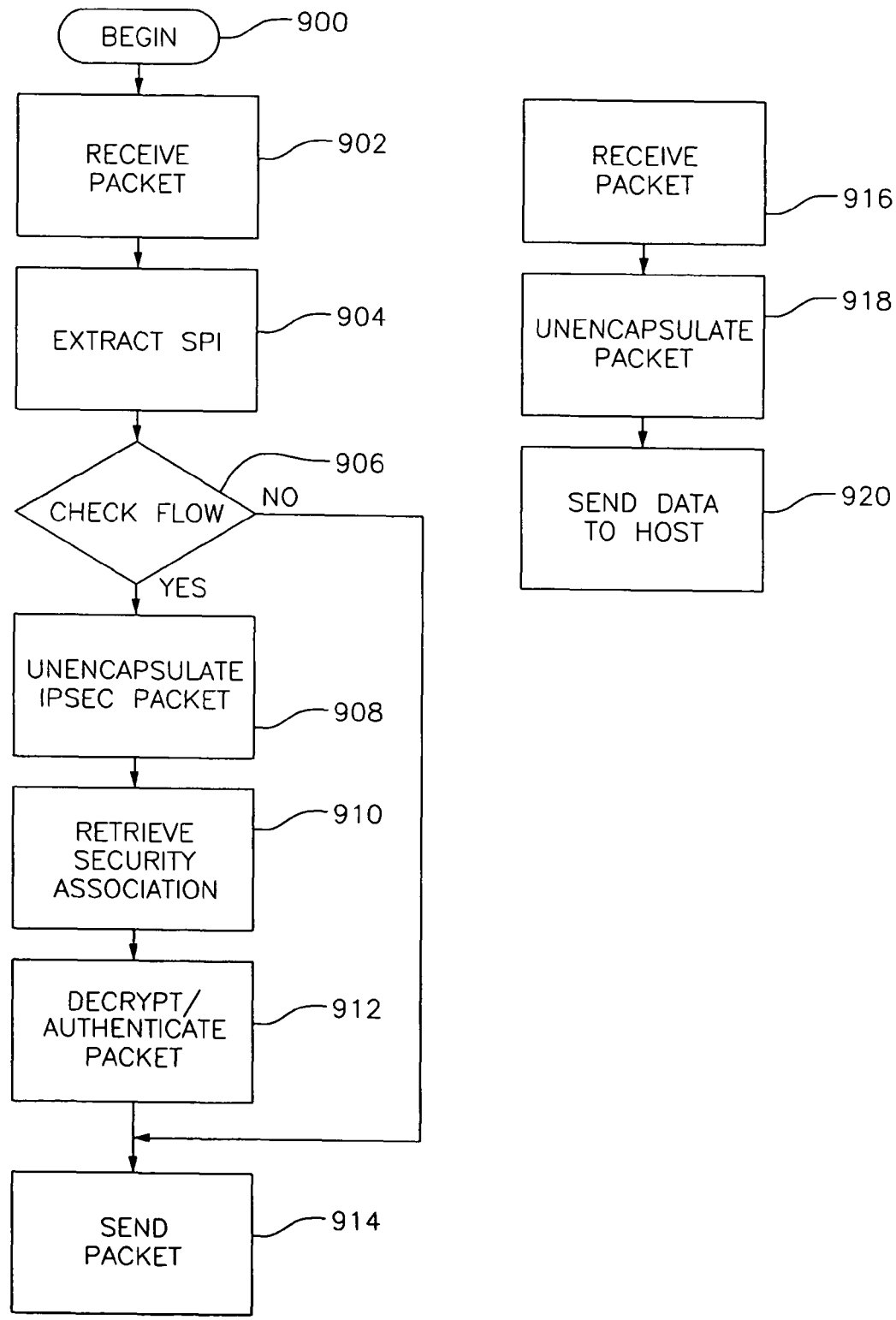
FIG. 11 is a flowchart representative of one embodiment of inbound processing operations that may be performed in accordance with the invention.
Figure 12:
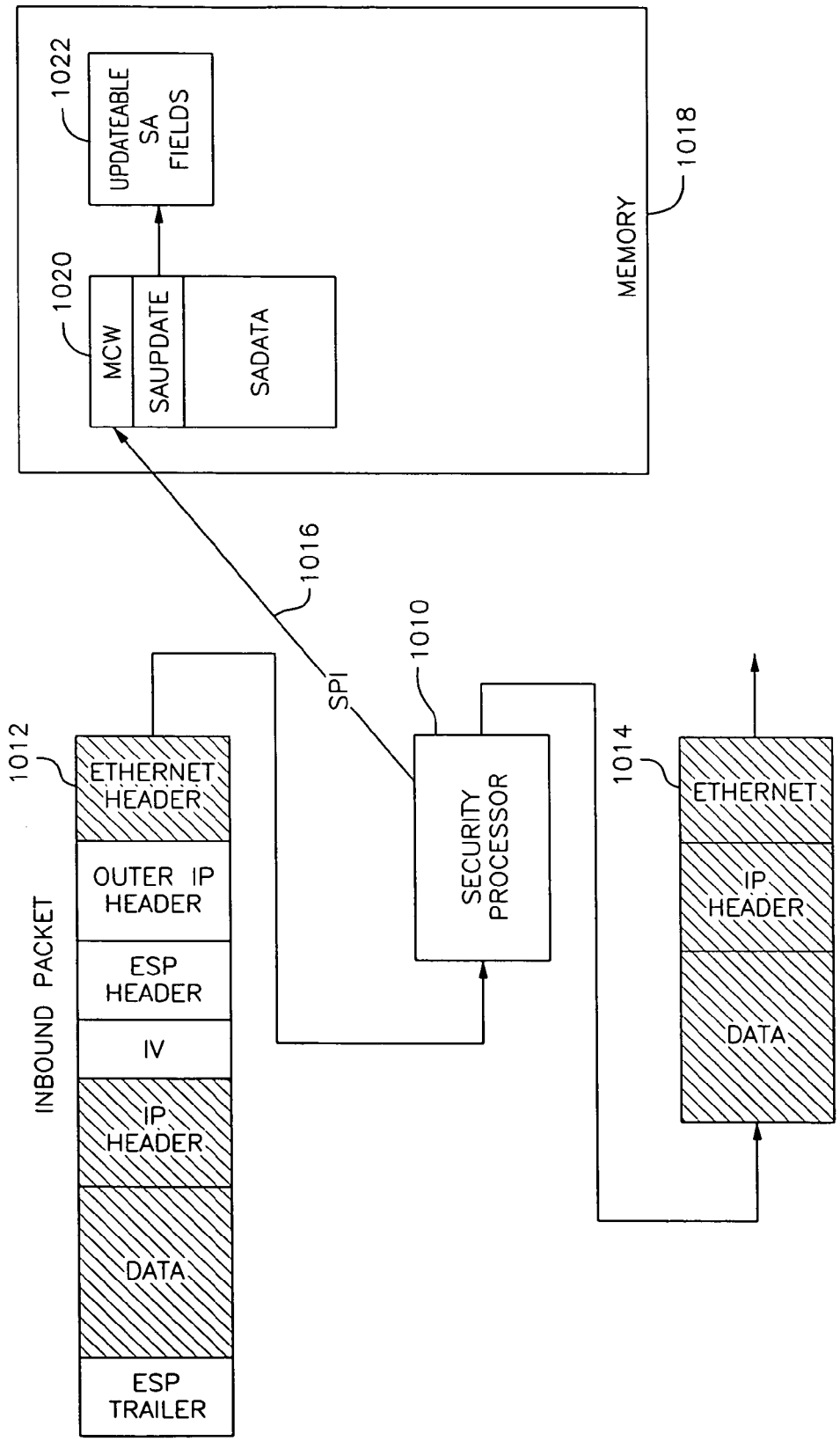
FIG. 12 is a block diagram representative of one embodiment of inbound processing flow in accordance with the invention.
Figure 13:
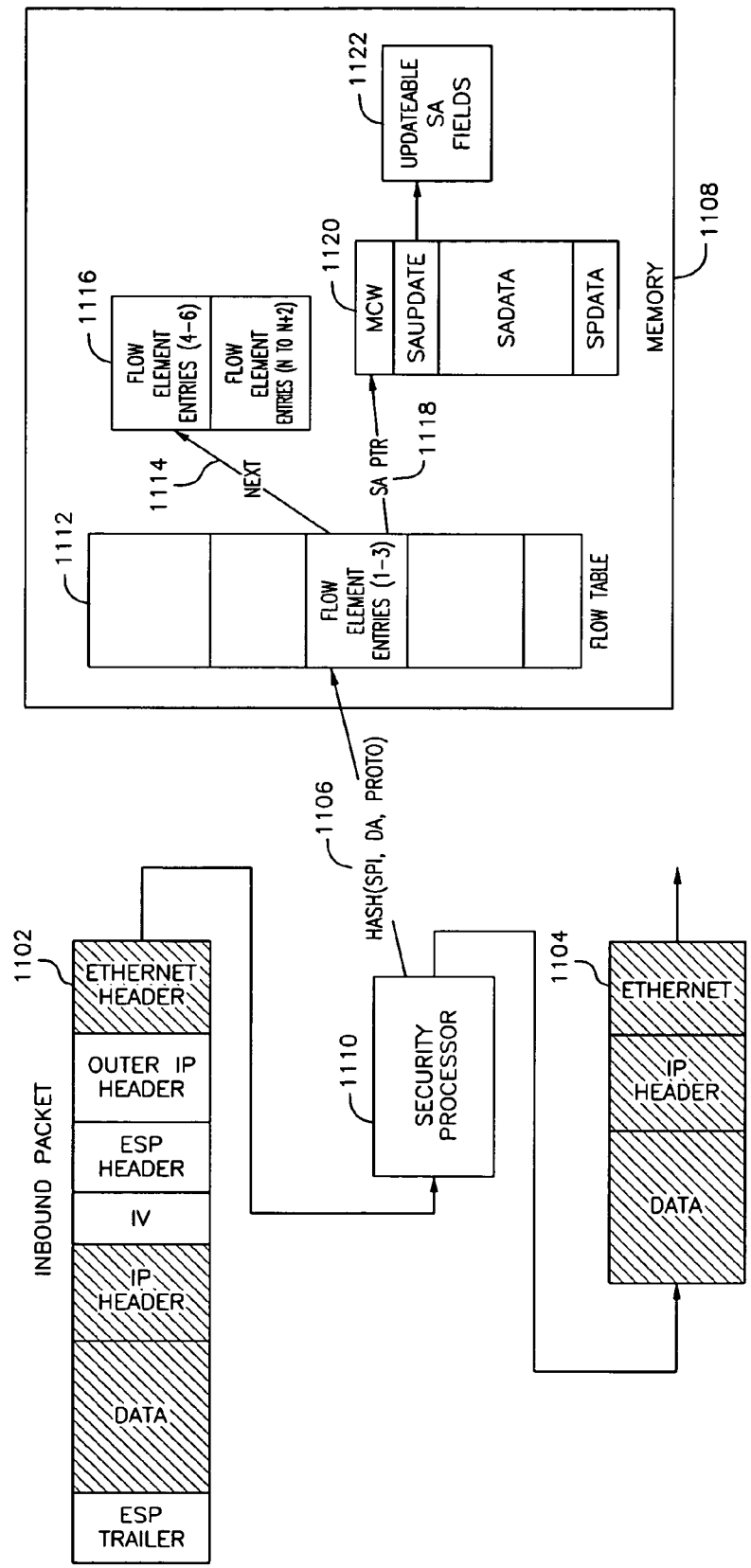
FIG. 13 is a block diagram representative of one embodiment of inbound processing flow in accordance with the invention.
Figure 14:
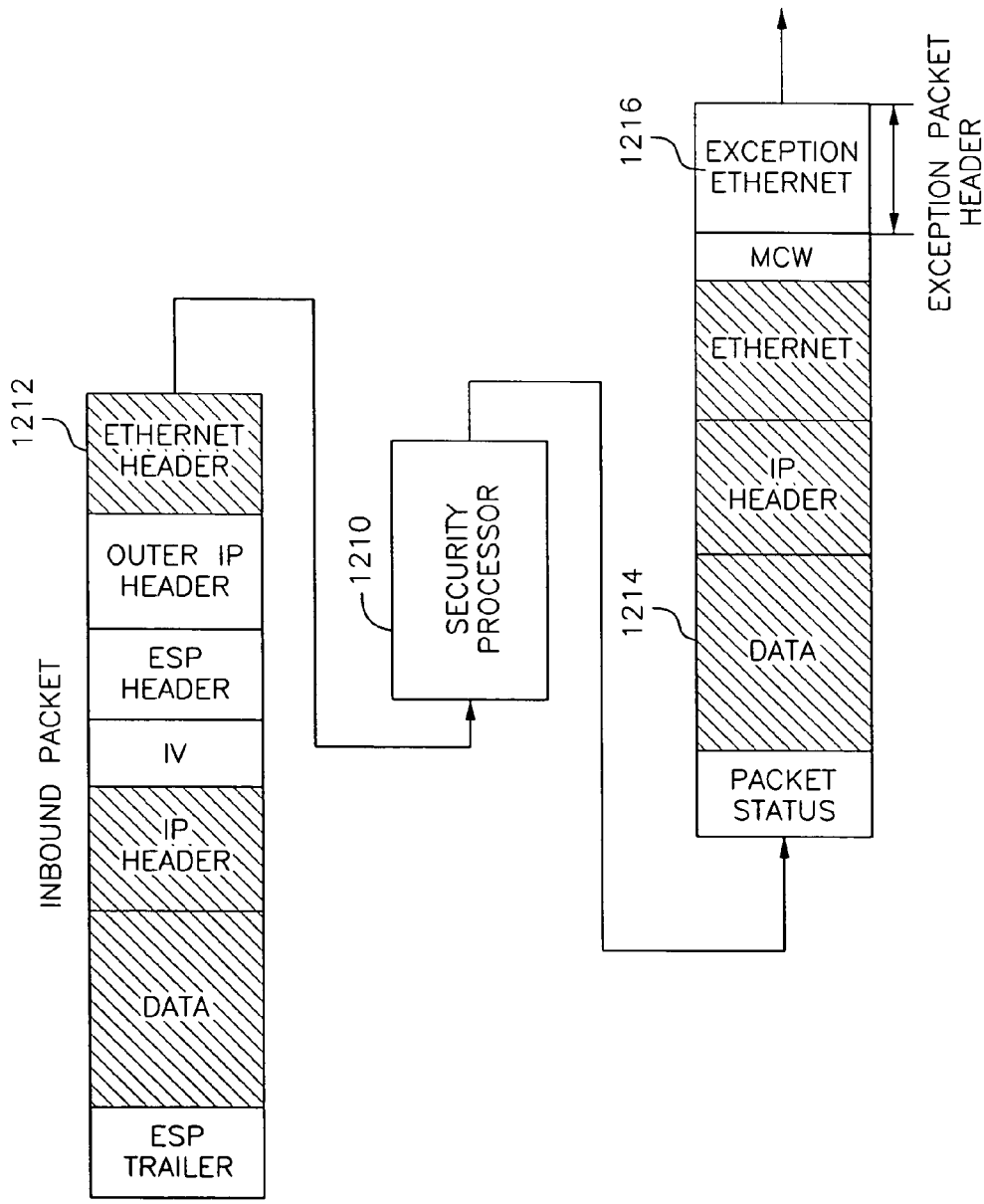
FIG. 14 is a flowchart representative of one embodiment of exception processing operations that may be performed in accordance with the invention.

Referring now to FIGS. 8-14, the operations of one embodiment of a security system constructed according to the invention will be treated in more detail. FIG. 8 describes configuration operations. FIGS. 9 and 10 describe operations for outbound packets. FIGS. 11, 12 and 13 describe operations for inbound packets. FIG. 14 describes operations for exception packets.

FIG. 8 describes a few selected operations that may be performed after the system is reset. Blocks 600-612 describe several operations of a security processor. Blocks 614-632 describe several operations of a host processor.

When the security processor is reset as represented by block 600, the security processor sets all host-side interfaces to return data back on the same channel from which it was received and sets all line side interfaces to block all traffic. This may be accomplished by setting an appropriate default value for the MCW. In addition, input signals may be used to set each GMAC to a host side or a line side configuration.

After the security processor exits reset, the security processor may default to a low power mode (block 602) depending on the state of a LOW_PWR# input signal. In low power mode the entire IPsec data path, the public key data path and external memory are disabled. For example, they may be placed in the low power state by gating their clock. Thus, only packets targeted at the bypass data path are allowed during this state.

In one embodiment, the security processor is initialized (block 604) using a side band MDIO interface to control the integrated SERDES core and to initialize internal registers. In this embodiment, the MDIO interface: 1) configures the SERDES to the proper line speed; 2) releases the security processor from the low power state, hence it enables the IPsec data path; 3) sets MAC speed (10/100/1000); 4) sets the host side MAC to the promiscuous state; and 5) set the line side MAC to the promiscuous state (block 606).

The rest of the configuration for the security processor may be initialized through the Ethernet controller by the host processor using configuration packets.

After a reset for a WakeOnLan mode of the secure NIC, the security processor is not released from the low power state. Instead, an MDC/MDIO interface is used to set up a pass through from the host side ports to the line side ports. This may be accomplished by programming an appropriate value for the default MCW and by releasing the block state on the line side port.

The security processor accepts configuration accesses through any host side interface (block 608). The host configuration packets are extracted from the Ethernet data packets. One embodiment of an extraction process is described below. The extracted packet may contain the return Ethernet address (set by the host) for the processed configuration access packet.

One embodiment of the invention supports four types of configuration packets: 1) register access packets (RAP); 2) memory access packets (MAP); 3) MODEXP access packets (MEP); and 4) flow update access packets (FAP).

The host may use memory access packets to manage the layout and format information stored in the local memory of the security processor. The security processor executes each of the memory accesses coherently and in correct order with data packets. The host may use a HostContext field in the configuration packets to add sequence numbers, processing tags, etc., to the packet.

The local memory also stores security association information sent by the host processor (block 610). As discussed above, the host processor may specify the locations in data memory at which the security association are stored. One embodiment of a security processor stores some of the security associations internally and, if necessary, stores additional security associations in an external memory such as a dual data rate SDRAM ("DDR-SDRAM"). The DDR-SDRAM configuration may be set by the host via a configuration access packet and stored in local EEPROM.

After the security processor is configured it processes packet traffic as discussed herein (block 612).

After the host processor is reset as represented by block 614, the host processor configures the security operations of the system (block 616). As represented by dashed line 618, this includes some of the operations discussed in conjunction with block 608.

The host processor also cooperates with an Ethernet controller to set up communication paths (block 620) and TCP sessions (block 622) with other host processors through the security processor's connections to the Ethernet network.

In the case of secure sessions (block 624), the host processor generates unique security associations for each secure session (block 626). The host processor then sends the security associations to the security processor (block 628), for example, via a packet network. As represented by dashed line 630, this may include some of the operations discussed in conjunction with block 610.

After the host processor completes these initialization steps it processes packet traffic as discussed herein (block 632).

FIG. 9 describes a few selected operations that may be performed to process outbound packets. Blocks 716-730 describe several operations of a security processor 810 (FIG. 10). Blocks 700-714 describe several operations of an Ethernet controller. In the described embodiment the Ethernet controller includes TCP offload capability as discussed herein. For embodiments where the bulk of the TCP/IP processing is performed by the host processor, the host processor may perform the operations represented by blocks 704-714.

After the outbound operation begins as represented by block 700, the Ethernet controller receives data from the host processor (block 702).

As represented by block 704, the Ethernet controller performs TCP/IP processing as discussed herein to packetize the data from the host. As this process typically involves building the packet, the Ethernet controller has ready access to the IP header information such as the source address, the destination address and the protocol. In addition, the Ethernet controller has ready access to the TCP header information such as the source port and destination port. In some embodiments the Ethernet controller stores this information for each session in a context memory. This information may be used to uniquely define a flow in IPsec. Hence, this information may be used to identify the security associations associated with a given secure session (block 706). Thus, the Ethernet controller may identify flow identifier information (e.g., a security association address, etc.) for the secure session (block 708).

As represented by blocks 710 and 712 the Ethernet controller generates a security header for the TCP/IP packet and encapsulates the TCP/IP packet in the security header. This operation may encompass the procedures discussed above in conjunction with FIG. 5. For example, the destination address may be set to the address of the security processor and the Ethernet type may be specified. In addition, a header containing the flow identifier may be added to the packet.

The Ethernet controller then sends the packet to the security processor as represented by block 714. FIG. 10 depicts one embodiment of an outbound packet 812. Starting from the right side of the packet, the packet 812 includes the Ethernet security header, a CLASS-0 identifier (discussed below), and the original TCP/IP packet (Ethernet header, IP header and data).

Turning now to the operations of the security processor 810, the security processor 810 handles four types of packets from the host side interface: 1) configuration access packets (Class-FAMILY, CHIP); 2) outbound IPsec packets (CLASS-0); 3) outbound IP packets (DEFAULT_MCW); and 4) outbound non-IP packets (DEFAULT_MCW set MCW.NOP). The FAMILY, CHIP classification may be used to denote a particular family of chips for a manufacturer and a specific chip within that family. For example, a family of chips could define a manufacturer's security products.

When the security processor 810 receives a packet 812 (block 716 in FIG. 9), the security processor 810 verifies that the destination address of the outer header matches the address of the security processor 810. Then, the security processor 810 searches the Ethernet type field in the security header to determine the type of packet as listed above. Any non-IPsec or non-IP packets are passed through the security processor 810 essentially without modification. The security processor 810 may recalculate the Ethernet CRC.

If the security processor 810 determines that it should process the packet (block 718) the security processor 810 strips the security header (block 720) and reads the type field in the tag header.

Next, the security processor 810 attempts to retrieve the flow identifier information (block 722). All packets in the CLASS-0 format will have the flow identifier in the packet.

As represented by line 818, the security processor 810 uses the flow identifier information to construct a direct address security association handle. The lower 22 bits of the FlowID refer to the location of the security association in memory (e.g., local memory 816). The upper two bits 822 of the 24-bit flow ID may be used to store the length of the security association. FIG. 10 depicts one embodiment of a security association 820.

The security processor 810 uses a default MCW for any packets that do not have a defined type. The host may set bits in the MCW to indicate that the packet should be dropped (MCW.DropPacket) or that the packet should be passed through (MCW.NOP). The security processor 810 processes any CLASS-FAMILY=security packets as configuration packets.

The security processor 810 may be configured to drop any packets that do not contain a valid flow identifier (range check on the direct addresses). A deleted security association location must contain an MCW with the MCW.DropPacket bit set (an MCW of all zeros may be used to indicate a deleted security association that forces an exception packet). Any traffic that is intended to pass through the security processor 810 may be placed on a flow that indicates NOP in the MCW (bypasses IPsec processing). All other traffic is dropped (or returned as an error) by the security processor 810.

An inner Ethernet header that does not contain an IP packet may either be passed or dropped by the security processor 810.

In the configuration shown in FIG. 10, the host has already performed the security association lookup. The direct address of the security association is passed in the CLASS-0 tag as the flow identifier. The result is a fixed latency through the security processor 810 as the security processor 810 does not need to do the flow lookup for any outbound packets. Moreover, this fixed latency may be obtained without the use of relatively expensive content addressable memory or cache memory that might otherwise be used to identify or store the security association for a given flow.

As represented by blocks 724, 726 and 728, the security processor 810 retrieves the security association data (e.g., keys and type of algorithm) from memory, encrypts/authenticates the packet using the security association data and assembles the IPsec packet. The resulting processed packet (e.g., packet 814) contains the inner Ethernet header ready for transmission (modified by the security processor 810 to contain the proper length for transmission on IP packets). As shown in FIG. 10, the packet 814 includes, from right to left, the inner Ethernet header, the outer IP header and IPsec information (ESP header, Initial Vector), the encrypted IP header and data, and the IPsec ESP trailer.

The security processor then transmits the packet 814 over the Ethernet network (block 730).

In some applications, a previously encapsulated packet may be sent to the security processor 810 using the CLASS-FAMILY=security packet type. This packet will be encrypted/authenticated by the security processor 810 using the security association data ("SAData") stored either in local memory or passed in-band with the packet. This format is required for some Microsoft applications. A SAData.Cap_En bit may be set to zero to prevent the security processor 810 from attempting encapsulation for these types of packets.

FIG. 11 describes a few selected operations that may be performed to process inbound packets. Blocks 900-914 describe several operations of a security processor 1010 (FIG. 12). Blocks 916-920 describe several operations of an Ethernet controller.

As represented by block 902, the security processor 1010 receives inbound packets 1012 (FIG. 12) from the Ethernet network. Any packets that enter the security processor 1010 from the LINE side interface are tagged with a DEFAULT_MCW that indicates an "inbound" packet. The security processor 1010 may be configured to bypass inbound non-IPsec traffic (no lookup done on the packet). The inbound non-IPsec traffic may be forwarded to the host without modification. Any non-IP traffic also may be passed through to the host without modification. Configuration packets are not allowed on a line side interface.

For inbound IPsec traffic where a security parameter index ("SPI") value can be controlled (block 904), the SPI may be used directly by the security processor 1010 to find the security association data as represented by line 1016 in FIG. 12. For example, the SPI may contain the address of the security association data 1020 in a memory 1018. The security processor performs a range check on all direct addresses to ensure that they are within the range of the established security association memory. Any direct access that is "out of range" is considered a flow not-found.

At block 906 the security processor 1010 checks the flow to determine whether the flow is within the range assigned to the security processor 1010. The security processor 1110 may be configured to bypass any packets for which a flow is not found. This allows the host to terminate IPsec for the packet. The security processor 1010 may be configured to either bypass inbound flow miss packets (typical for an SNIC configuration) or flag them as errors (returned on the exception path).

If IPsec processing behind the SNIC is required (e.g., the SNIC is not offloading all of the possible sessions), the security processor allows data to pass through the device to the host. In general, the security processor may be configured to allow any inbound IPsec packet that is not found in the flow (or security association, SPI) lookup to be passed through to the host without any errors.

If at block 906 the flow is within the range assigned to the security processor 1010, the security processor 1010 unencapsulates the IPsec packet (block 908), retrieves the security association (block 910) and decrypts/authenticates the encrypted/authenticated IP header and data (block 912). As depicted in FIG. 12, an SAUpdate field in the security association data 1020 may be used to point to updateable security association fields 1022. The security processor 1010 sends the reassembled packet 1014 to the Ethernet controller (block 914).

After the Ethernet controller receives the packet (block 916), the Ethernet controller unencapsulates the packet (block 918) and sends the data to the host processor (block 920).

FIG. 13 depicts IPsec traffic flow for an embodiment where the SPI value of some inbound packets cannot be controlled. In this case, the security processor 1110 retrieves the SPI, destination address ("DA") and protocol ("PROTO") fields of the packet and as represented by lines 1106 and 1114 performs a hash algorithm into the inbound flow table 1112 and 1116 to find the security association 1120 in the memory 1108. In one embodiment, the security processor 1110 performs an exact match search to verify that it has found the proper security association.

A decrypted/authenticated packet may be returned by the security processor 1110 without removing the decapsulate (as required for some implementations) if SAData.Cap_En=0.

Referring to FIG. 14, the security processor 1210 may return exception packets over the GMAC host side interface. Any exception packets (inbound or outbound) 1212 are returned to the exception path (set to the GMAC host side interface for a SNIC configuration). The security processor 1210 adds a programmable header 1216 to the error packet 1214. For example, this may be an Ethernet header with a tag set in the TYPE field to the return host. If the added header is Ethernet, the security processor 1210 calculates the proper Ethernet length field.

In one embodiment, the security processor 1210 returns error packets with only one type of header. In this case, the host may have to parse the MCW and PacketStatus fields that may be in the packet.

Figure 15:
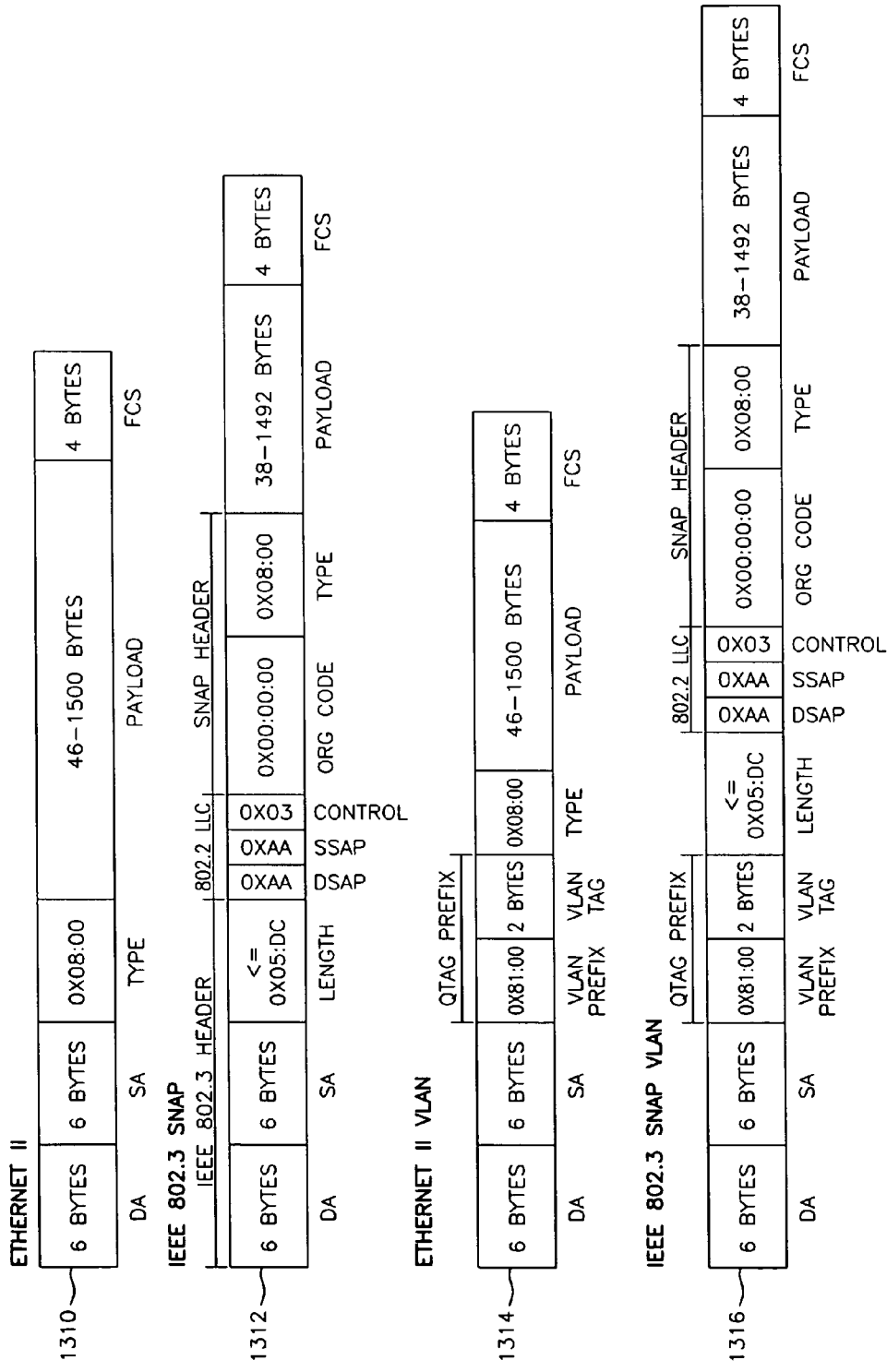
FIG. 15 is a block diagram representative of Ethernet frame formats.

With the above description in mind, one embodiment of Ethernet header processing will now be discussed in conjunction with FIGS. 15-18. Referring initially to FIG. 15, if the IP header is framed by an Ethernet MAC header then the security processor will calculate the offset to the IP header. In one embodiment there are four supported Ethernet types, each with a different offset to the IP header:

1) Ethernet II (IEEE 802.3) (1310 in FIG. 15);
2) Ethernet SNAP (IEEE 802.3, RFC 1042) (1312 in FIG. 15);
3) Ethernet II VLAN (IEEE 802.3, IEEE 802.3 ac) (1314 in FIG. 15); and
4) Ethernet SNAP VLAN (IEEE 802.3, IEEE 802.3 ac) (1316 in FIG. 15).

Referring again to FIG. 3, the security processor may processes the Ethernet header (e.g., outer header 66) to extract in-band communication over a host side interface as discussed above. The packet is identified using the Ethernet type field 62 of the Ethernet header. This mechanism may be used for any of the supported Ethernet formats.

As discussed above, the security processor recognizes two formats of this custom in-band communication scheme. The first format (CLASS-0) is intended for all devices of a company where a flow tag has been used to identify the unique "flow" for a packet. The second format (CLASS-F for FAMILY) is used on a per chip basis for configuration access that is defined by the device.

Figure 16:
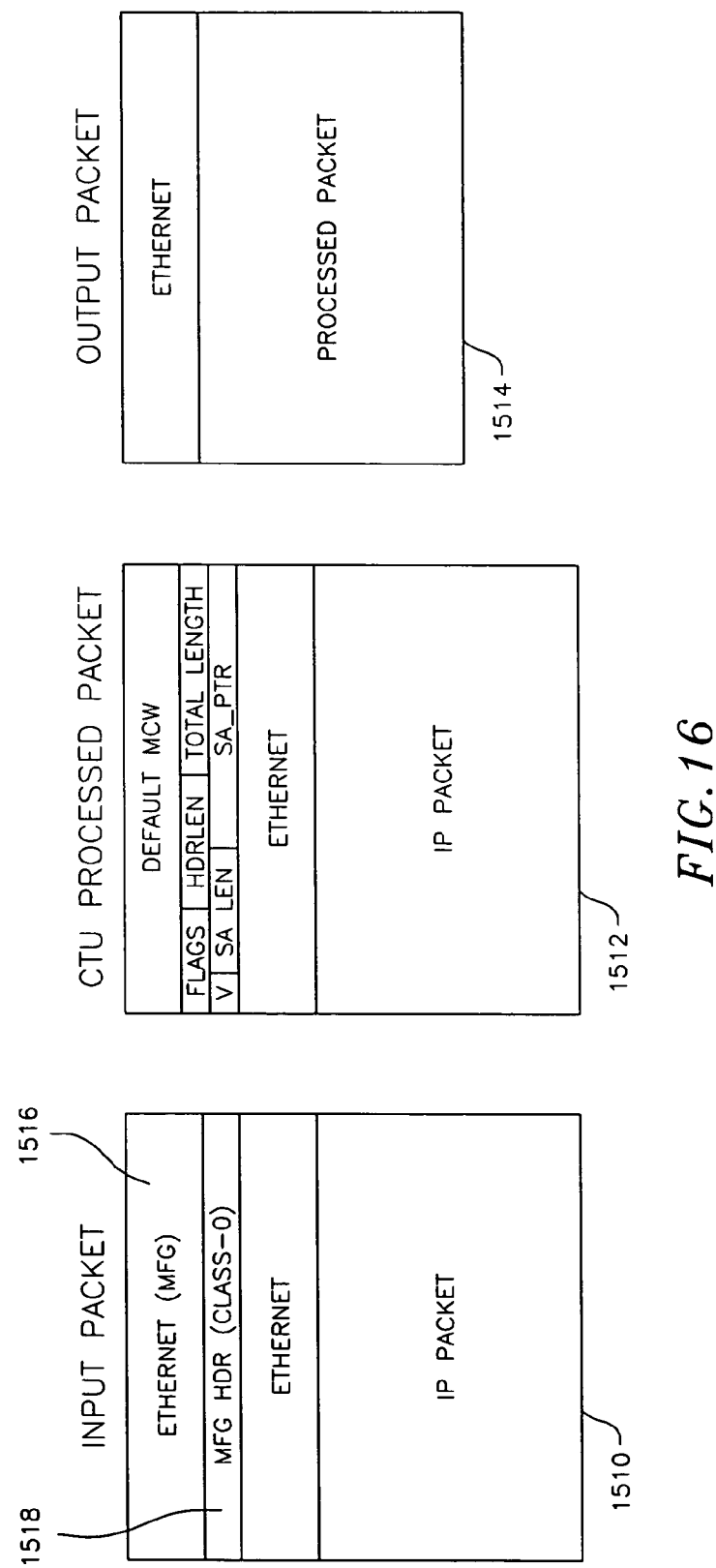
FIG. 16 is a block diagram representative of one embodiment of IPsec packet processing in accordance with the invention.

Referring to the CLASS-0 case of FIG. 16, the security processor strips off the outer Ethernet header 1516 containing the manufacturer ("MFG") Ethernet type 1518 from an input packet 1510. When the security processor finds a CLASS-0 MFG_HDR 1518 the security processor adds a CLASS0_MCW value and uses the FlowID as the security association pointer ("SA_PTR") along with a default security association length ("SA_LEN") to construct a "direct" security association handle ("SAHandle") field for the packet 1512 shown in FIG. 16. The upper two bits of FlowID are used to select up to four different default lengths. The SAData Structure should be one of four default lengths for all security associations when using this mode. Typically there would be one length for transport packets and another for tunnel packets. After IPsec processing, the security processor outputs a packet 1514.

Figure 17:
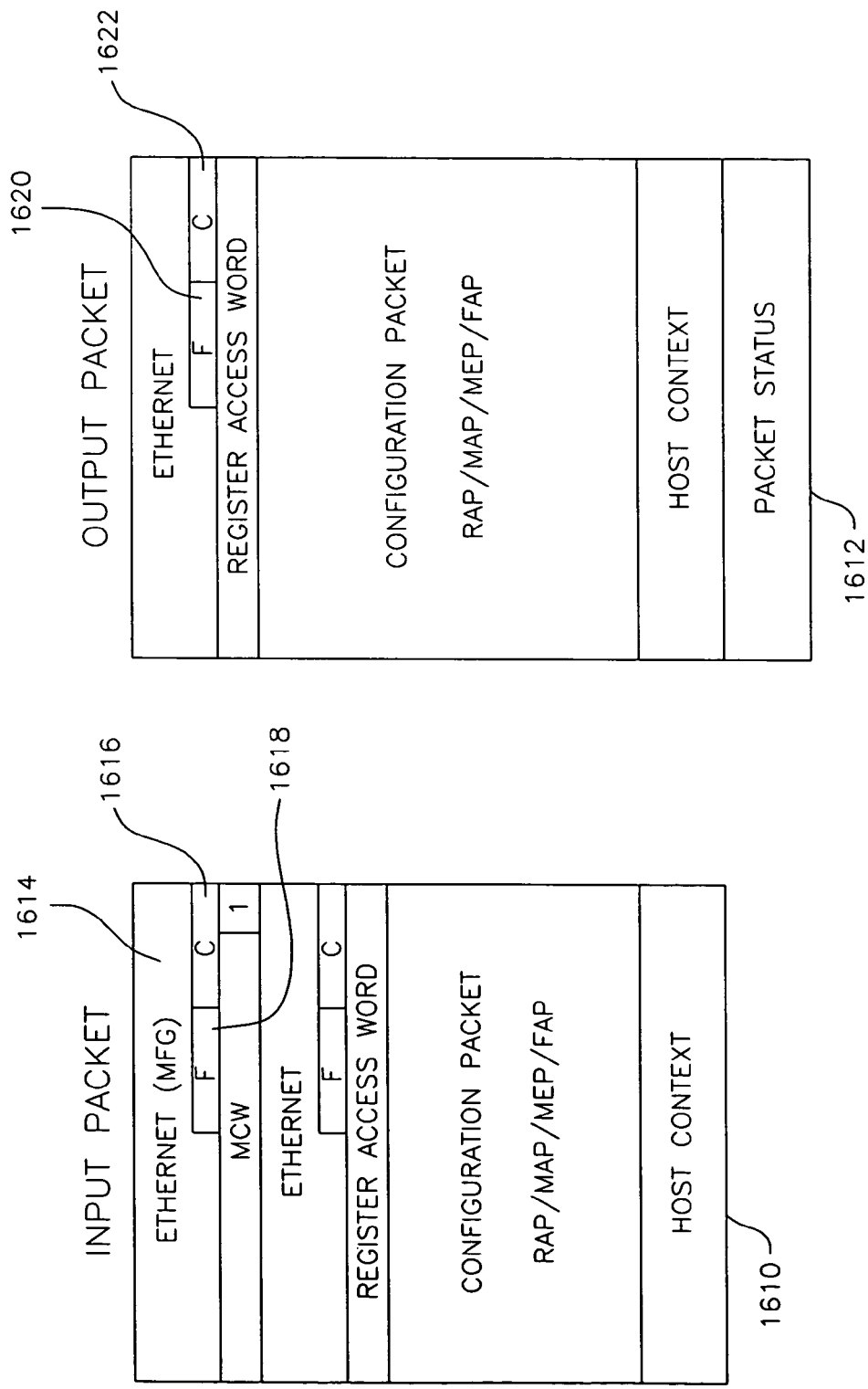
FIG. 17 is a block diagram representative of one embodiment of configuration packet processing in accordance with the invention.

Referring to the CLASS-F case of FIG. 17, the processing for a CLASS-F-C MFG_HDR involves processing a class (e.g., "F" for a family of chips) and sub-class (e.g., "C" for a specific chip in that family) for the current chip as discussed above. The security processor discards the original header 1614 and the two bytes of CLASS/SUB-CLASS 1618, 1616 of the input packet 1610. This results in a 32 bit aligned MCW that is processed by the security processor. The configuration packet 1612 is returned to the host via the second Ethernet header, which should be properly formatted by the host.

The security processor also may allow an Ethernet header to be embedded in the configuration packet depicted in FIG. 17. When the Ethernet header is embedded in a non-data packet type, the four-byte 0xF-C code is used to align a RegisterAccessWord to a 32-bit boundary (already aligned on input). The security processor does not change this Ethernet header prior to being sent. Therefore, the host should predict the size of the resulting packet with the proper Ethernet length.

Figure 18:
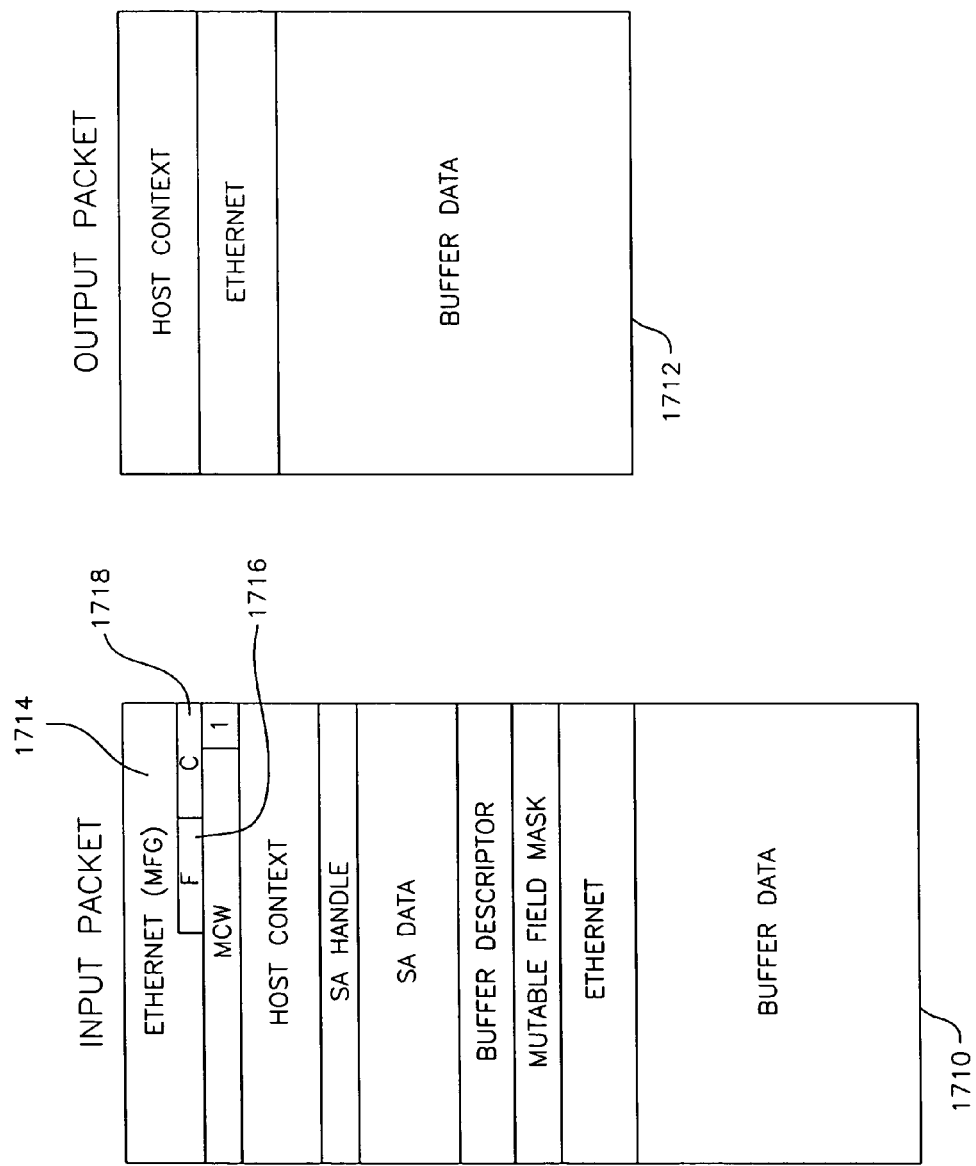
FIG. 18 is a block diagram representative of one embodiment of data packet processing in accordance with the invention.

Referring to FIG. 18, the security processor CLASS-F packet type may be used to send a regular packet with a host constructed MCW that matches the packet formats. In this case, the Ethernet header is handled normally. The security processor recalculates the Ethernet header length and adds/removes the gap between the Ethernet header and the IP header to generate the output packet 1712.

The above discussion illustrates one example of how the invention may be implemented. It should be understood, however, that the invention may be practiced using other packet processing techniques. For example, information similar to that described above may be inserted into conventional headers. In addition, the system could be configured to not add the special header yet always assume that the header is present. In this case, the system could add a simple tag to the header (even in front of the header). Furthermore, the outer header could be omitted and the security processor configured to assume that all packets received from a given source will be in bytes. In addition, the security processor could be configured to add the inner Ethernet header.

Also, different implementations may be used to locate the security association information. For example, rather than using the FlowID, a hashing algorithm may be used on information such as the source address, destination address, protocol, source port and destination port. The FlowID may be calculated by other components in the system. The FlowID may include other information related to the security association other than a direct address.

Figure 19:
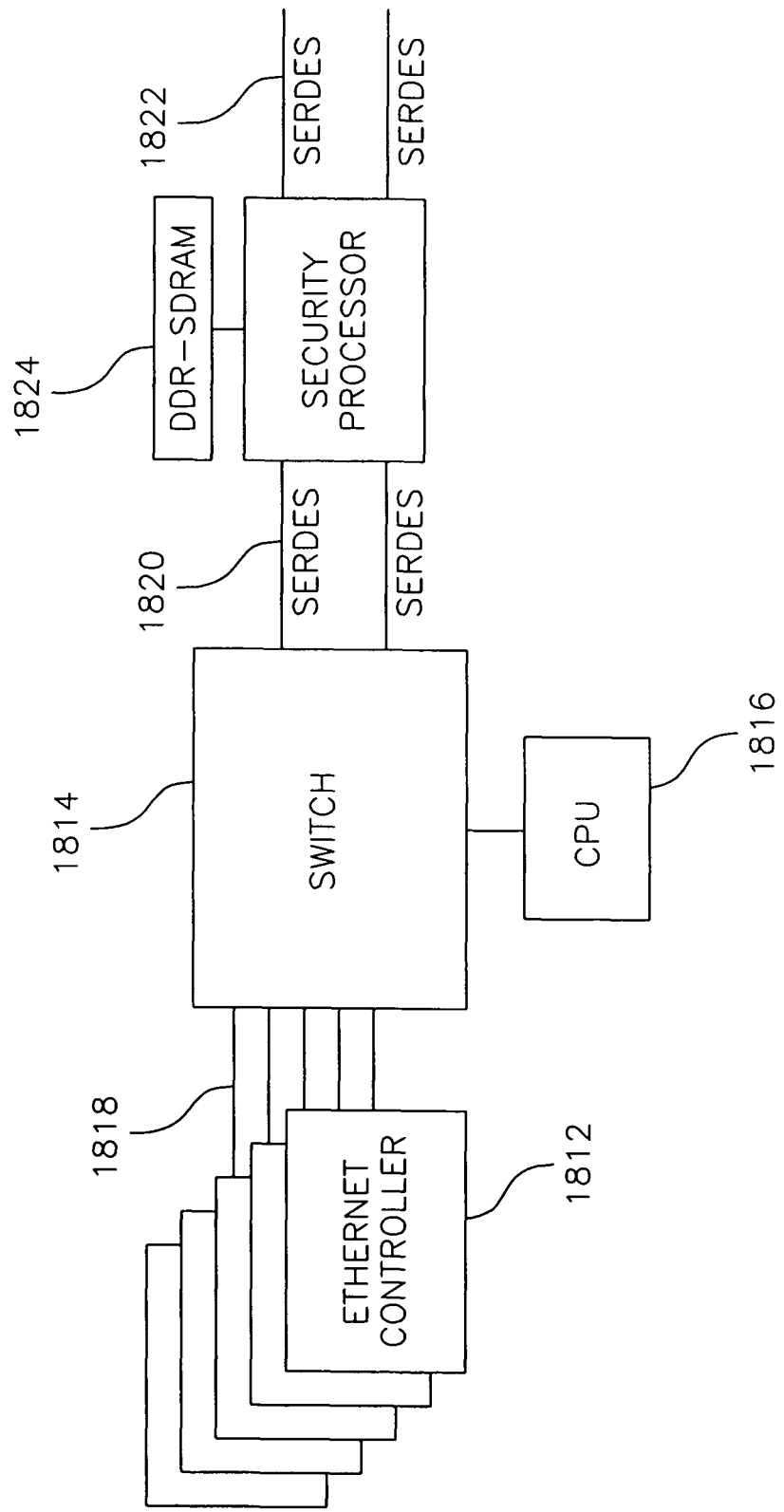
FIG. 19 is a block diagram of one embodiment of a security processing system constructed in accordance with the invention.

FIG. 19 depicts an embodiment of the invention where one or more security processors 1810 provide services to one or more Ethernet controllers (or other networking devices) 1812. In this embodiment, the security processor 1810 is connected using switch 1814 as a backplane or fabric. The interconnection of other devices such as host processors, network processors or external ports is possible in this configuration. Outbound packet flow is from the Ethernet controllers 1812 over networks 1818 through the switch 1814, to the security processor 1810 via network 1820 and out to the network 1822.

The security processor 1810 is managed over the switch fabric by one or more host processors 1816. For example, the host processors 1816 may configure the security processor 1810 when the security processor is reset. In addition, the host processors 1816 may allocate the address space in the security processor 1810 to each of the Ethernet controller 1812 as each Ethernet controller 1812 comes on line. This address space may be used to store the security association information for sessions associated with each Ethernet controller. In this case, the Ethernet controllers 1812 may be configured to request access to the security processor 1810 from the host processors 1816.

In one embodiment, the switch 1814 adds a virtual LAN ("VLAN") tag to the packets received over networks 1818 from the Ethernet controllers 1812. In this way, the security processor 1810 may determine as to which Ethernet controller 1812 a given packet is associated.

From the above, it should be appreciated that by providing packet network connectivity in the security processors, communications with the security processors may be achieved through network fabric such as a switch. Moreover, this may be accomplished using the same connectivity and procedures that may be used for directly connected devices (e.g., a SNIC implementation).

Figure 20:
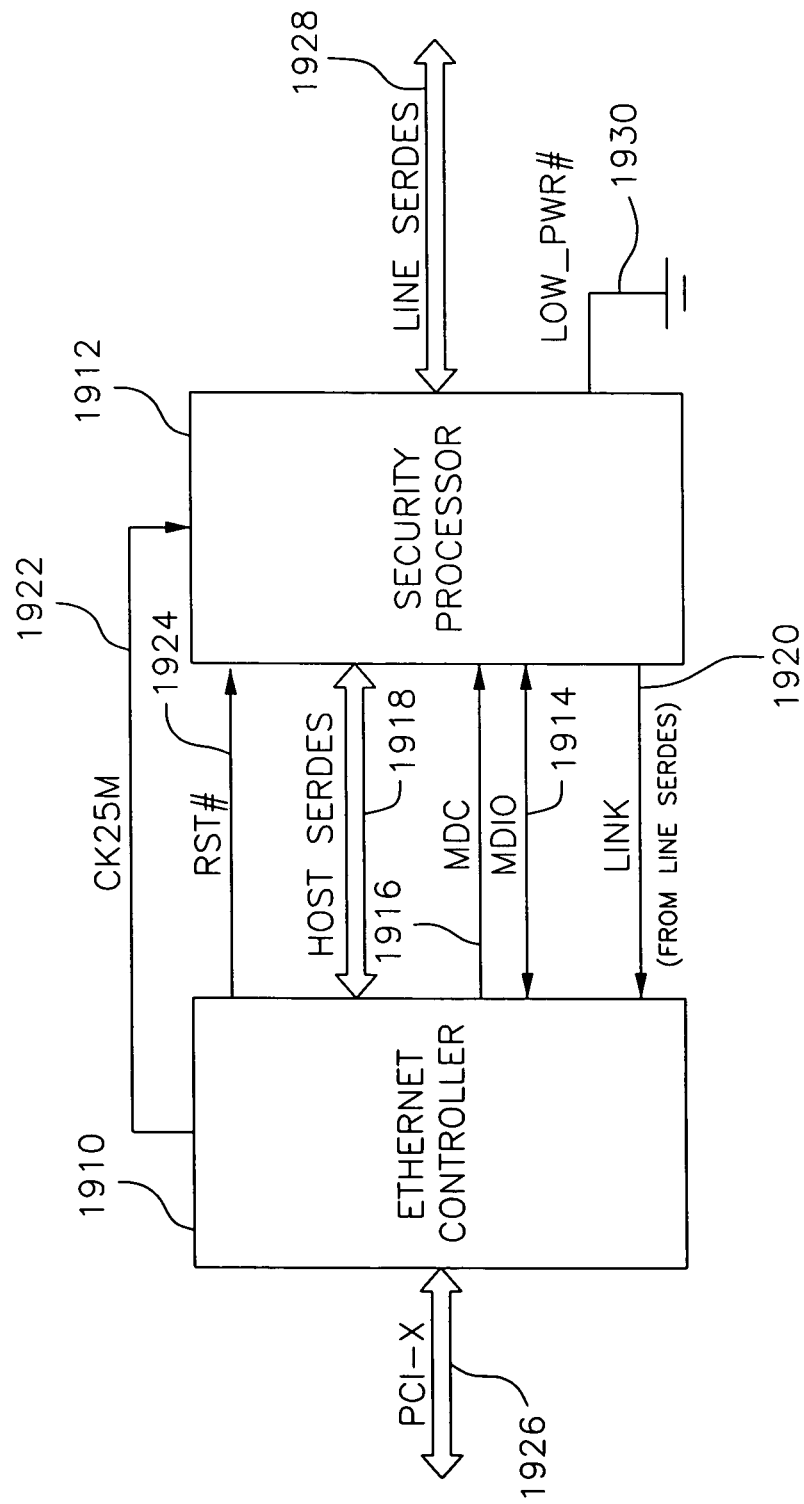
FIG. 20 is a block diagram of one embodiment of a security processing system constructed in accordance with the invention.

FIG. 20 illustrates one embodiment of interconnections between a security processor 1912 and an Ethernet controller on a secure NIC ("SNIC"). The Ethernet controller 1910 drives a reference clock 1922 and a system reset signal 1924. An MDC/MDIO interface 1916, 1914 may be used to configure the SERDES interface ports 1918 and 1928 on the security processor 1912. This interface may also be used to issue a reset (via register reset) and control the power state of the security processor 1912. The control provided by the MDC/MDIO interface may be used to configure the security processor during WakeOnLan mode. The security processor 1912 provides the link status of the line side SERDES 1928 to the host via a side band link 1920. When the LOW_PWR# input pin 1930 is tied to zero the security processor 1912 exits reset in a low power state.

Figure 21:
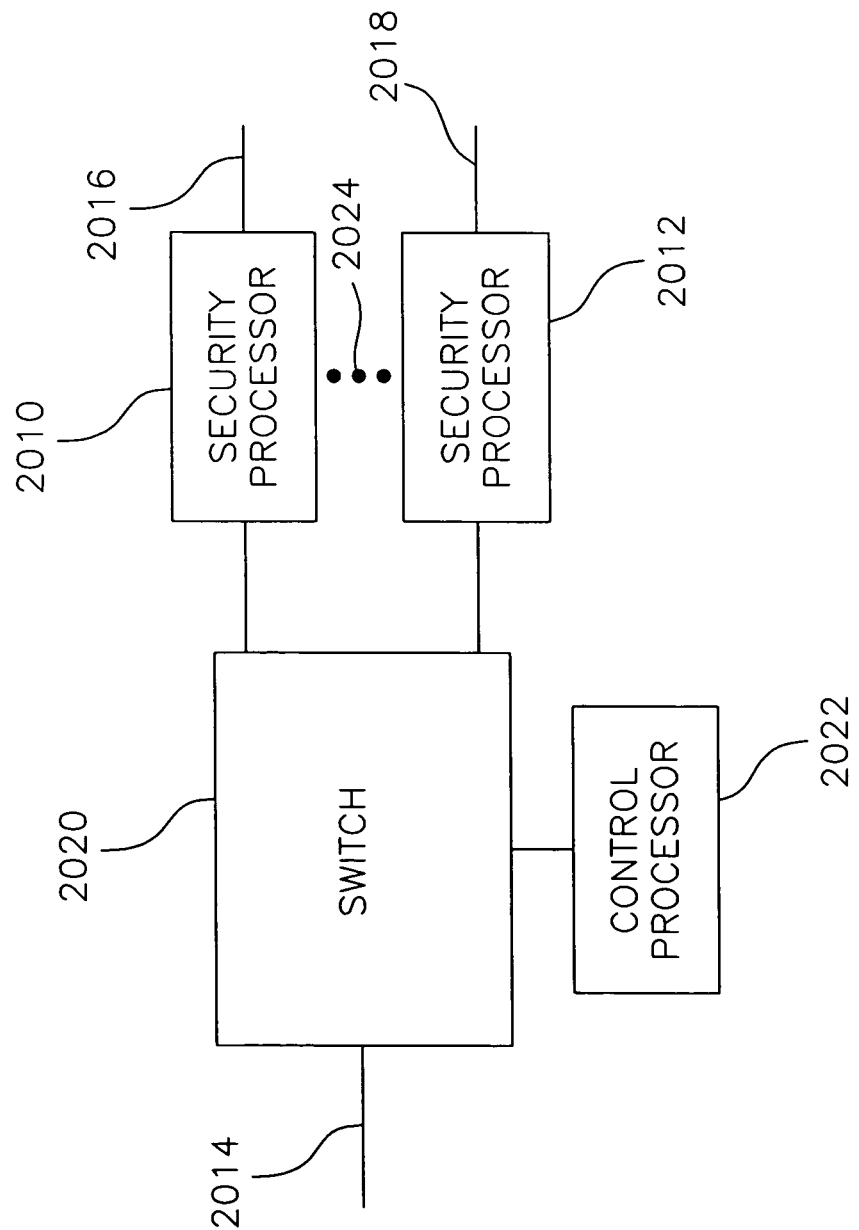
FIG. 21 is a block diagram of one embodiment of a security processing system constructed in accordance with the invention.

FIG. 21 depicts an embodiment of the invention where several security processors 2010, 2012 provide services to networking devices (not shown) via switch 2020. As represented by the ellipse 2024, two or more security processors may be configured to provide security processing. The security processors 2010, 2012 are managed over the switch fabric by one or more control processors 2022. In one embodiment a 10 Gbit Ethernet controller connects to the system via Ethernet network 2014. The switch 2020 distributes and collects the traffic to/from the security processors 2010, 2012, etc., to provide IPsec processing at 10 Gbits over a packet network 2016, 2018, etc.

In one embodiment, the switching system described herein is implemented as a chassis-based switch. For example, the chassis-based switch may include a backplane into which several blades (e.g., circuit cards) are plugged for interconnectivity. The switch/switching fabric is implemented as a switch blade in the chassis-based switch. An Ethernet controller and/or MAC may be incorporated into a processing blade in the chassis-based switch. A security processor may be incorporated into a switching blade in the chassis-based switch.

In one embodiment, a system may be implemented in a LAN-on-Motherboard configuration. Here, the host processor and the network processor reside on the motherboard. In this case, the security processor may be implemented on the motherboard or may be implemented as a separate component that connects to the network processor.

It should be appreciated that the inventions described herein are applicable to and may utilize many different protocols and standards and modifications and extensions of those protocols and standards including, for example and without limitation, IP, TCP, UDP, ICMP, IPsec, SSL and FCsec. Moreover, a variety of cryptographic and signature algorithms and modifications and extensions thereof may be used. The invention may be practiced using tunnel mode and/or transport mode packet processing.

The invention may be implemented on a variety of networks including, without limitation, Ethernet, ATM, FDDI and fiber channel. An appropriate media access controller (MAC) would be used for these different networks. In addition a MAC may or may not include ISO Level 3 and Level 4 processing.

A system constructed according to the invention may support, for example, IEEE standards 802.3ab, 802.3z and/or 802.3ae or any other speed or physical layer (e.g., SERDES).

It should also be appreciated that the inventions described herein may be constructed using a variety of physical components and configurations. For example, a variety of hardware and software processing components may be used to implement the functions of the host processors, security processors, network processors, the Ethernet processors/controllers and the other components and processes described herein. These hardware and software components include, without limitation, processors and associated data memory, state machines and logic and may involve execution of software, firmware or other code. Such components may be combined on one or more integrated circuits. For example, several of these components may be combined within a single integrated circuit. Some components may be implemented as a single integrated circuit. Some components may be implemented using several integrated circuits.

The components and operations discussed herein may be applicable to various other embodiments. For example, the components and operations described with respect to one of the described embodiments may be substituted or incorporated into other embodiments.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings may, for example, comprise a data network. In addition, these connections may be made with physical wire, fiber and/or wireless connections, for example.

A wide variety of devices may be used to implement the data memories discussed herein. For example, a data memory may comprise one or more RAM, disk drive, SDRAM, FLASH or other types of data storage devices.

The invention may be practiced using different types of cipher engines. For example, in one embodiment of the invention data is decrypted using a block cipher or a stream cipher.

In summary, the invention described herein teaches improved security processing techniques. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of generating encrypted packets comprising the steps of:
   receiving, in a security processor, a first Ethernet packet from an originating device, the first Ethernet packet comprising a second Ethernet packet and a memory address associated with a security association, wherein the second Ethernet packet includes a source address field specifying a source of the second Ethernet packet and a destination address field specifying a destination of the second Ethernet packet, and wherein the destination address field includes an address of the originating device;
   extracting the memory address and the second Ethernet packet from the first Ethernet packet;
   retrieving the security association from a memory using the received memory address; and
   encrypting a portion of the extracted second Ethernet packet according to the retrieved security association.

2. The method of claim 1, wherein the first Ethernet packet further comprises an outer Ethernet header and a manufacturer header.

3. The method of claim 2, wherein the manufacturer header includes the memory address.

4. The method of claim 3, wherein the outer Ethernet header comprises an Ethernet address of the security processor.

5. The method of claim 4, wherein the outer Ethernet header comprises an Ethernet type that is registered with an entity.

6. The method of claim 5, wherein a first byte of the manufacturer header is set to zero.

7. The method of claim 6, wherein a portion of the manufacturer header following the first byte of the manufacturer header includes the memory address.

8. The method of claim 1, wherein the extracting step comprises determining whether an Ethernet type field of the first Ethernet packet comprises an Ethernet type that is registered with an entity.

9. The method of claim 1, wherein the retrieving step comprises retrieving the security association from a memory in the security processor.

10. The method of claim 1, wherein the encrypting step comprises using an encryption key associated with the security association.

11. The method of claim 1, wherein the encrypting step comprises using an encryption algorithm defined by the security association.

12. The method of claim 1, wherein the extracting step comprises determining whether an Ethernet address from the first Ethernet packet matches an Ethernet address of the security processor.

13. A method of generating encrypted packets by processing, at a security processor, a first Ethernet packet from an originating device, the first Ethernet packet comprising a second Ethernet packet, the second Ethernet packet having a source address field specifying a source of the second Ethernet packet and a destination address field specifying a destination of the second Ethernet packet, the destination address field being pre-populated with an address of the originating device, and the first Ethernet packet further comprising a memory address associated with a security association, the method comprising the steps of:
   extracting the memory address and the second Ethernet packet from the first Ethernet packet;
   retrieving the security association from a memory using the extracted memory address;
   encrypting a portion of packet data of the extracted second Ethernet packet according to the retrieved security association; and
   returning the second Ethernet packet to the originating device, wherein the returned second Ethernet packet includes the encrypted packet data.

14. The method of claim 13, wherein the extracting step comprises determining whether an Ethernet type field of the first Ethernet packet comprises an Ethernet type that is registered with an entity.

15. The method of claim 13, wherein the extracting step comprises determining whether a first byte following an Ethernet type field from the first Ethernet packet is set to a zero.

16. The method of claim 13, wherein the extracting step comprises extracting an address from second, third, and fourth bytes following an Ethernet type field from the first Ethernet packet.

17. The method of claim 13, wherein the extracting step comprises extracting an address from a lower 22 bits of second, third, and fourth bytes following an Ethernet type field from the first Ethernet packet.

18. The method of claim 13, wherein the retrieving step comprises retrieving the security association from a memory in the security processor.

19. The method of claim 13, wherein the encrypting step comprises using an encryption key associated with the security association.

20. The method of claim 13, wherein the encrypting step comprises using an encryption algorithm defined by the security association.

21. The method of claim 13, wherein the extracting step comprises determining whether an Ethernet address from the first Ethernet packet matches an Ethernet address of the security processor.

22. A method of generating packets, at an originating device, to be encrypted by a security processor comprising the steps of:
   generating a first Ethernet packet, wherein the first Ethernet packet includes a header having an address of the originating device in a destination address field and packet data;
   associating a security association with the first Ethernet packet;
   identifying a memory address associated with the security association; and
   generating a second Ethernet packet encapsulating the memory address and the first Ethernet packet, wherein the second Ethernet packet has a source address field specifying a source of the second Ethernet packet and a destination address field specifying a destination of the second Ethernet packet, wherein the destination address field includes an address of the security processor,
   wherein a portion of the packet data of the generated first Ethernet packet is cryptographically processed by the security processor and the portion of the packet data is replaced with the cryptographically processed data when the first Ethernet packet is returned to the originating device.

23. The method of claim 22, wherein the generating a second Ethernet packet comprises generating an outer Ethernet header comprising an address of the security processor.

24. The method of claim 22, wherein the generating a second Ethernet packet comprises generating an outer Ethernet header and a manufacturer header.

25. The method of claim 24, wherein the outer Ethernet header comprises an Ethernet address of the security processor.

26. The method of claim 24, wherein the outer Ethernet header comprises an Ethernet to that is registered with an entity.

27. The method of claim 24, wherein the manufacturer header comprises the memory address.

28. The method of claim 24, wherein a first byte of the manufacturer header is set to zero.

29. The method of claim 24, wherein second, third and fourth bytes of the manufacturer header comprise the memory address.

30. The method of claim 22, further comprising the steps of:
receiving data to be sent over an Ethernet network; and
incorporating the data into the first Ethernet packet.

31. The method of claim 22, further comprising the step of transmitting the second Ethernet packet to the security processor.

32. A security processor for generating encrypted packets by processing a first Ethernet packet received from an originating device, the first Ethernet packet comprising a second Ethernet packet and a memory address associated with a security association, the second Ethernet packet having a source address field specifying a source of the second Ethernet packet and a destination address field specifying a destination of the second Ethernet packet, the destination address field including an address of the originating device, comprising:
a memory for storing the security association;
a Gigabit MAC for receiving the first Ethernet packet;
a processor, connected to receive at least a portion of the first Ethernet packet from the Gigabit MAC, configured to:
extract the memory address from the first Ethernet packet; and
retrieve the security association from the memory using the extracted memory address; and
an encryption processor, connected to the processor, for encrypting at least a portion of the second Ethernet packet according to the retrieved security association; and
a unit configured to transmit the second Ethernet packet, including the at least a portion encrypted by the encryption processor, to the originating device.

33. The security processor of claim 32, wherein the first Ethernet packet comprises an outer Ethernet header and a manufacturer header including the memory address.

34. The security processor of claim 32, wherein the encryption processor comprises a IPsec processor.

35. The security processor of claim 32, wherein the security processor is an integrated circuit.

* * * * *

UNITED STATES PATENT AND TRADEMARK OFFICE
CERTIFICATE OF CORRECTION

| | |
|---|---|
| PATENT NO. | : 9,015,467 B2 |
| APPLICATION NO. | : 10/728192 |
| DATED | : April 21, 2015 |
| INVENTOR(S) | : Buer et al. |

It is certified that error appears in the above-identified patent and that said Letters Patent is hereby corrected as shown below:

In the Claims

Column 23, line 14, please replace "Ethernet to" with --Ethernet type--.

Signed and Sealed this
Eighteenth Day of August, 2015

Michelle K. Lee
*Director of the United States Patent and Trademark Office*